United States Patent
Saxena et al.

(10) Patent No.: US 8,507,565 B2
(45) Date of Patent: *Aug. 13, 2013

(54) POLYORGANOSILOXANE DEMULSIFIER COMPOSITIONS AND METHODS OF MAKING SAME

(75) Inventors: Anubhav Saxena, Bangalore (IN); Monjit Phukan, Bangalore (IN); Senthilkumar U., Bangalore (IN); Ian Procter, Bogis-Bossey (CH); Sigfredo Gonzalez, Danbury, CT (US); Kalman Koczo, Suffern, NY (US); Sabine Azouani, Ferney Voltaire (FR); Vikram Kumar, Bangalore (IN)

(73) Assignee: Momentive Performance Material Inc., Waterford, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/159,770

(22) Filed: Jun. 14, 2011

(65) Prior Publication Data

US 2011/0245354 A1 Oct. 6, 2011

Related U.S. Application Data

(62) Division of application No. 12/011,241, filed on Jan. 25, 2008, now Pat. No. 8,030,363.

(51) Int. Cl.
- *B01D 17/05* (2006.01)
- *C08L 83/04* (2006.01)
- *C10G 33/04* (2006.01)
- *C10L 1/28* (2006.01)

(52) U.S. Cl.
USPC ............ 516/144; 44/300; 44/320; 208/188; 210/708; 524/588

(58) Field of Classification Search
USPC ............. 516/144; 44/300, 320; 208/188; 210/708; 524/588
See application file for complete search history.

(56) References Cited

U.S. PATENT DOCUMENTS

| | | | |
|---|---|---|---|
| 2,499,368 A | 3/1950 | De Groote et al. | |
| 2,499,370 A | 3/1950 | De Grotte et al. | |
| 2,524,889 A | 10/1950 | De Grotte et al. | |
| 2,560,333 A | 10/1950 | De Grotte et al. | |
| 3,438,889 A | 4/1969 | Racine et al. | |
| 3,572,510 A | 3/1971 | Lyda | |
| 3,700,400 A | 10/1972 | Cuthbertsen | |
| 3,907,701 A | 9/1975 | Liebold et al. | |
| 3,974,220 A | 8/1976 | Heib et al. | |
| 4,227,173 A | 10/1980 | Clark | |
| 4,387,028 A | 6/1983 | Fee | |
| 4,451,671 A | 5/1984 | Diery et al. | |
| 4,536,339 A | 8/1985 | Ritschel et al. | |
| 4,596,653 A | 6/1986 | Graham et al. | |
| 5,004,559 A | 4/1991 | Koerner et al. | |
| 5,421,993 A | 6/1995 | Hille et al. | |
| 5,620,485 A | 4/1997 | Fey | |
| 6,001,140 A | 12/1999 | Grabowski et al. | |
| 6,093,222 A | 7/2000 | Grabowski et al. | |
| 6,133,370 A | 10/2000 | Gutek et al. | |
| 6,451,863 B1 | 9/2002 | Ebbrecht et al. | |
| 6,521,586 B1 | 2/2003 | Hoogland et al. | |
| 6,521,587 B1 | 2/2003 | L'Hostis et al. | |
| 6,531,540 B1 | 3/2003 | O'Brien | |
| 6,727,388 B2 | 4/2004 | Golden | |
| 7,745,501 B2 * | 6/2010 | Koczo et al. | 516/144 |
| 8,030,363 B2 * | 10/2011 | Saxena et al. | 516/144 |
| 2002/0129542 A1 | 9/2002 | Grabowski | |
| 2005/0080221 A1 | 4/2005 | Meyer | |
| 2009/0007483 A1 | 1/2009 | Hansel et al. | |

FOREIGN PATENT DOCUMENTS

| | | |
|---|---|---|
| DE | 3622571 A1 | 1/1988 |
| DE | 102004018926 | 11/2005 |
| EP | 0670342 A | 9/1995 |
| EP | 1035154 A | 9/2000 |
| EP | 1400554 B1 | 3/2006 |

OTHER PUBLICATIONS

Machine Translation for DE102004018926A1, Patent document publ. Nov. 17, 2005, European Patent Office, Obtained online @ http://ep.spacenet.com/numberSearch?locale=en_EP, (downloaded Oct. 26, 2010).

Derwent Abstract on EAST, week 200578, London: Derwent Publications Ltd., AN 2005-760568, DE102004018926 A1, (Goldschmidt GMBHO, abstract.

Derwent Abstract on EAST, week 200868, London: Derwent Publications Ltd., AN 2008-L53292, CN 101104694 A, (Goldschmidt AG TH), abstract.

* cited by examiner

*Primary Examiner* — Daniel S Metzmaier
(74) *Attorney, Agent, or Firm* — Dominick G. Vicari; Kenneth S. Wheelock

(57) ABSTRACT

The invention relates to a method for separating emulsions of oil and water, the method comprising incorporating a demulsifying-effective amount of a polyorganosiloxane demulsifier into an emulsion comprising an oil phase and an aqueous phase. The invention also relates to compositions containing polyorganosiloxane demulsifier and the water and oil phases of an emulsion.

27 Claims, No Drawings

POLYORGANOSILOXANE DEMULSIFIER COMPOSITIONS AND METHODS OF MAKING SAME

CROSS REFERENCE TO RELATED APPLICATIONS

The present application is a divisional of U.S. application Ser. No. 12/011,241 filed Jan. 25, 2008, now issued as U.S. Pat. No. 8,030,363, to which priority is claimed and which is herein incorporated by reference.

FIELD OF THE INVENTION

The invention relates to polyorganosiloxane demulsifiers of particular use in separating water emulsified in oil.

BACKGROUND

Demulsifying agents break emulsions and/or mixtures of polar solutes like water, and non-polar solvents like oil. They are used in functional fluids (such as, but not limited to, metal removal fluids, greases, rust and oxidation fluids, hydraulic oils, compressor oils, fuels and transformer fluids) to inhibit formation of emulsions, break emulsions that have developed, and to inhibit corrosion.

Emulsions and mixtures can be separated by various means including mechanical, thermal, and chemical. The mechanical separation of mixtures can generally result in the at least partial separation of aqueous and/or oil phases that may be present in the mixture, but when these phases are present in the form of an emulsion, mechanical separation often fails to provide a desirable degree of separation. Various chemical means have been provided for separation of emulsified phase mixtures, but various industries require stilt further levels of separation that here to fore have not been adequately provided by conventional chemical means.

Among their industrial uses, demulsifiers are commonly used to dehydrate and desalt crude oil during extraction or refinement. Typically, during production of crude oil, water gets emulsified to it to give a water-in-oil emulsion. This water-in-oil emulsion gives rise to several down stream problems; corrosion during refinery processes and greater energy requirement to pump the more viscous emulsion are to name a few. Thus, demulsifiers are extensively used in oil field applications to break water in crude oil emulsions.

Other industrial uses include hydraulic systems wherein the demulsifiers must be effective at high temperatures, often in excess of 300° C. Failure of a demulsifier in a hydraulic system may lead to catastrophic failure. Demulsifiers are also frequently put to use in hydraulic systems to prevent corrosion. In the presumed mechanism of corrosion inhibition, the demulsifier adsorbs on the metal surface forming a protective film against polar solutes.

Demulsifiers are known in the art and usually comprise blends of surface active chemicals and the spectrum of usable compounds has been expanded particularly due to the introduction of specific organic silicone compounds for breaking petroleum emulsions. However, despite the large number of demulsifiers available on the market, it is not possible to break all of the occurring petroleum/water emulsions rapidly, safely, efficiently, and with small quantities of addition products.

There remains a need for demulsifiers capable of breaking and/or separating such emulsions more effectively.

SUMMARY OF THE INVENTION

These and other objectives have been achieved by providing a method for separating emulsions of oil and water, the method comprising incorporating a demulsifying-effective amount of at least one polyorganosiloxane demulsifier into an emulsion comprising an oil phase and an aqueous phase, the polyorganosiloxane demulsifier having a molecular structure comprising a polysiloxane backbone of at least two siloxane units covalently bound to (i) one or more pendant alkylene oxide groups comprising one or more alkylene oxide units independently having 1 to 6 carbon atoms, (ii) one or more pendant groups having the formula $(C_rH_{2r})B$ wherein r equals 0 to 30 and B is an aryl radical, and optionally (iii) one or more pendant alkyl groups with up to 40 carbon atoms.

In another aspect, the invention relates to a composition comprising:
  a) a demulsifying-effective amount of at least one polyorganosiloxane demulsifier having a molecular structure comprising a polysiloxane backbone of at least two siloxane units covalently bound to (i) one or more pendant alkylene oxide groups comprising one or more alkylene oxide units independently having 1 to 6 carbon atoms, (ii) one or more pendant groups having the formula $(C_rH_{2r})B$ wherein r equals 0-30 and B is an aryl radical; and optionally (iii) one or more pendant alkyl groups with up to forty carbon atoms;
  b) an aqueous phase; and
  c) an oil phase.

The present invention advantageously provides a method for demulsifying emulsions by using at least one polyorganosiloxane having a molecular structure comprising a polysiloxane backbone with one or more pendant alkylene oxide groups, one or more pendant groups having the formula $(C_rH_{2r})B$ wherein r equals 0 to 30 and B is an aryl radical and optionally one or more alkyl groups with up to forty carbon atoms. The demulsification method disclosed herein is capable of improving the separation of components in stabilized emulsions while being cost-effective and practical in a variety of industrial operations.

DETAILED DESCRIPTION OF THE INVENTION

In one aspect, the invention is directed to a method for separating the components of an emulsion comprising an oil phase and an aqueous phase. The method comprises incorporating a demulsifying-effective amount of a polyorganosiloxane demulsifier into the emulsion to separate the oil phase from the aqueous phase.

The emulsion can be, for example, a water-in-oil or oil-in-water emulsion. The emulsions particularly considered herein are those wherein the emulsified component is in the form of droplets with droplet sizes in the range of about 0.1 microns up to about 200 microns, more typically about 1-100 microns. The emulsified component can be unstabilized, but is more typically stabilized by a stabilizing amount of a surfactant and/or dispersed particulate solid.

The aqueous phase can be either an emulsified water phase in a continuous oil phase (i.e., in a water-in-oil emulsion) or a continuous water phase containing an emulsified oil phase. In either case, the aqueous phase can be essentially pure water, or alternatively, water with varying amounts of solid (particulate) materials, salt or other chemicals.

The oil phase can be either an emulsified oil phase in a continuous aqueous phase (i.e., an oil-in-water emulsion) or a continuous oil phase containing an emulsified water phase. In either case, the oil phase is any hydrophobic phase substantially insoluble with the aqueous phase. For example, the oil phase can be composed of one or more hydrophobic chemicals, typically liquids, which individually or in combination are mainly insoluble with the aqueous phase. Such hydrophobic chemicals can be, for example, linear or branched, cyclic or acyclic, saturated or unsaturated, aliphatic or aromatic hydrocarbons. The hydrocarbons typically contain at least six carbon atoms and can be unsubstituted, or alternatively, substituted with one or more heteroatoms (e.g., hydroxyl, amino, carboxyl, amide, anhydride, ester, or ether groups) as long as the hydrocarbons remain mainly insoluble with the aqueous phase.

Some examples of oil phases include halogenated or non-halogenated $C_2$-$C_{30}$ hydrocarbons, and more particularly, halogenated or non-halogenated ethenes, butadienes, pentanes, hexanes, heptanes, octanes, benzenes, toluene, ethylbenzenes, xylenes, naphthalene, cresols, naphtha, fats, lubrication oils, petroleum, gasoline, crude oil, fuel oils, jet fuels, heating oils, cleaning oils, vegetable oils, mineral oils, and tar or bitumen derivatives.

It will be understood herein that the terms polyorganosiloxane and organopolysiloxane are interchangeable with one another. It will also be understood that the polyorganosiloxane structures of the present invention will assume random distributions of the various building blocks therein (i.e., M, D, T and Q units), and a distribution of groups (e.g., alkyleneoxide, alkyl and aryl) among the M, D, T and Q units to provide average compositions as known within the art.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range and any combination of the various endpoints of such ranges or subranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The polyorganosiloxane demulsifier has a molecular structure comprising a polysiloxane backbone of at least two siloxane units covalently bound to (i) one or more alkylene oxide groups, and (ii) one or more aryl functional groups and (iii) optionally one or more alkyl groups with up to forty carbon atoms.

The polysiloxane backbone of the polyorganosiloxane demulsifier can be a linear, branched, or crosslinked polymeric framework of —Si—O— (siloxy) bonds, and can include any two or more of a combination of M, D, T, and Q groups, wherein, as known in the art, an M group represents a monofunctional group of formula $R_3SiO_{1/2}$, a D group represents a bifunctional group of formula $R_2SiO_{2/2}$, a T group represents a trifunctional group of formula $RSiO_{3/2}$, and a Q group represents a tetrafunctional group of formula $SiO_{4/2}$. Some examples of classes of polysiloxane backbone structures include the MM, MDM, TD, MT, MDT, MDTQ, MQ, MDQ, and MTQ classes of polysiloxanes, and combinations thereof.

The number of siloxane units in the polysiloxane backbone can be two (e.g., MM), but is typically at least three or greater. In one embodiment, the number of siloxane units is at least three and less than or equal to about 500. In another embodiment, the number of siloxane units is less than 200. For example, for an $MD_nM$ type of polysiloxane backbone, n can be 0, 1, or a number up to about 500, or alternatively, a number not greater than 198.

Typically, the R groups in the polysiloxane backbone are independently selected from hydrogen (H), halogen, and linear or branched, cyclic or acyclic, saturated or unsaturated hydrocarbon groups containing one to twenty carbon atoms and optionally heteroatom-substituted with one or more oxygen and/or nitrogen atoms. Some examples of suitable hydrocarbon groups for R include methyl, ethyl, n-propyl, isopropyl, n-butyl, isobutyl, sec-butyl, t-butyl, n-pentyl, isopentyl, neopentyl, n-hexyl, n-octyl, isooctyl, n-hexenyl, vinyl, allyl, butenyl, butadienyl, cyclopropyl, cyclobutyl, cyclopentyl, cyclohexyl, cyclohexenyl, phenyl, alkylated phenyl groups, hydroxyl, methoxy, ethoxy, isopropoxy, n-butyloxy, t-butyloxy, isobutyloxy, n-pentoxy, neopentoxy, n-hexoxy, n-heptoxy, n-octoxy, phenoxy, vinyloxy, allyloxy, 2-methoxyethoxy, 2-ethoxyethoxy, 2-aminoethoxy, methylamino, dimethylamino, benzylamino, ethanolamino, and diethanolamino groups.

The R groups are more typically hydrocarbon groups, hydroxyl or alkoxy groups containing one to thirty carbon atoms, and even more typically methyl, ethyl, methoxy, hydroxyl or ethoxy groups. One or more R groups of the polysiloxane backbone are necessarily replaced or substituted by one or more alkylene oxide groups and one or more alkyl and/or aryl groups, in accordance with the molecular structure of the polyorganosiloxane demulsifier described above.

The one or more alkylene oxide groups covalently bound to the polysiloxane backbone comprise one or more alkylene oxide units. More typically, each alkylene oxide group comprises at least 1 and up to about 100 alkylene oxide units. Each alkylene oxide unit independently contains one to six carbon atoms. Some examples of alkylene oxide units include methyleneoxy (—$OCH_2$—), ethyleneoxy (—$OCH_2CH_2$—), propyleneoxy (—$OCH(CH_3)CH_2$—), trimethyleneoxy (—$OCH_2CH_2CH_2$—), butyleneoxy (e.g., —$OCH_2CH_2CH_2CH_2$—, —$OCH(CH_3)CH_2CH_2$— or —$OCH(CH_3)CH(CH_3)$—), and pentamethyleneoxy (—$OCH_2CH_2CH_2CH_2CH_2$—) units.

In one embodiment, the alkylene oxide group contains only one type of alkylene oxide unit. For example, the alkylene oxide group can be a polymethylene oxide, polyethylene oxide, polypropylene oxide, or polybutylene oxide.

In another embodiment, the alkylene oxide group contains at least two different types of alkylene oxide units. For example, the alkylene oxide group can be a copolymer having two, three, or four different types of alkylene oxide units selected from methylene oxide (MO), ethylene oxide (EO), propylene oxide (PO), and butylene oxide (BO) units. The copolymers can be block, random, or graft copolymers. Some examples of block copolymers include EO-MO, EO-PO, EO-BO, MO-BO, EO-MO-EO, EO-PO-EO, PO-EO-PO and EO-PO-BO types of polymers wherein each MO, EO, PO, and BO in the foregoing examples represents a block of one or more of the indicated alkylene oxide units. According another embodiment of the invention, more than one kind of polyether can be provided for in the molecule (i.e. hydrosilylation with polyether blends), e.g., all EO polyether and an all PO polyether in the same component.

In one embodiment, the alkylene oxide group is bound to the polysiloxane backbone directly, i.e., through a silicon-oxygen bond. In another embodiment, the alkylene oxide group is bound to the polysiloxane backbone indirectly through a linker X, which links a silicon atom of the polysiloxane backbone to the alkylene oxide group.

The linking group X is typically an alkylene group (—$C_vH_{2v}$—) where v is 1 or a higher integer. More typically, X is an alkylene linking group wherein v is 1 to 6, e.g., methylene (—CH$_2$—), dimethylene (—CH$_2$CH$_2$—), or trimethylene (—CH$_2$CH$_2$CH$_2$—). The linker X can also be branched as in —C(CH$_3$)$_2$—, —CH$_2$CH(CH$_3$)CH$_2$—, or —CH$_2$C(CH$_3$)$_2$CH$_2$—. The linker X can also be etherified, as in [(—CH$_2$—)$_u$—O—(—CH$_2$—)$_v$]$_w$, wherein u and v are independently 0, 1 or a higher integer, and w is 1 or a higher integer.

The alkyl and/or aryl functional groups are covalently bound to the polysiloxane backbone. The alkyl and/or aryl functional groups can be covalently bound directly to one or more silicon atoms of the polysiloxane backbone, or alternatively, indirectly through a linker, such as X, as described above.

According to an embodiment of the invention a method for separating emulsions of oil and water, the method comprising incorporating a demulsifying-effective amount of at least one polyorganosiloxane into an emulsion comprising an oil phase and an aqueous phase, the polyorganosiloxane demulsifier according to the formula:

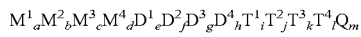

wherein:
M$^1$=R$^1$R$^2$R$^3$SiO$_{1/2}$
M$^2$=R$^4$R$^5$R$^6$SiO$_{1/2}$
M$^3$=R$^7$R$^8$R$^9$SiO$_{1/2}$
M$^4$=R$^{10}$R$^{11}$R$^{12}$SiO$_{2/2}$
D$^1$=R$^{13}$R$^{14}$SiO$_{2/2}$
D$^2$=R$^{15}$R$^{16}$SiO$_{2/2}$
D$^3$=R$^{17}$R$^{18}$SiO$_{2/2}$
D$^4$=R$^{19}$R$^{20}$SiO$_{2/2}$
T$^1$=R$^{21}$SiO$_{3/2}$
T$^2$=R$^{22}$SiO$_{3/2}$
T$^3$=R$^{23}$SiO$_{3/2}$
T$^4$=R$^{24}$SiO$_{3/2}$
Q=SiO$_{4/2}$ and, R$^1$ is an alkyl group having from 1 to 12 carbon atoms, an OH or OR$^{25}$; R$^2$, R$^3$, R$^5$, R$^6$, R$^8$, R$^9$, R$^{13}$, R$^{14}$, R$^{16}$, R$^{18}$, R$^{21}$ are alkyl groups having from 1 to 12 carbon atoms; R$^4$, R$^{15}$, R$^{22}$ are (C$_n$H$_{2n}$)—O—(C$_2$H$_4$O)$_o$—(C$_3$H$_6$O)$_p$—(C$_4$H$_8$O)$_q$—R$^{26}$, n equals 0 to 6, o equals 0 to 100, p equals 0 to 100 and q equals 0 to 50, provided o+p+q≧1; R$^7$, R$^{17}$, R$^{23}$ are branched, linear or cyclic, saturated or unsaturated alkyl groups having from 4 to 36 carbon atoms; R$^{10}$, R$^{19}$, R$^{24}$ are aryl groups having the general formula (C$_r$H$_{2r}$)B wherein r equals 0-30 and B is an aryl radical; R$^{11}$, R$^{12}$, R$^{20}$ are aryl groups having the general formula (C$_r$H$_{2r}$)B, wherein r equals 0 to 30 or an alkyl group having from 1 to 12 carbon atoms; R$^{25}$ is an alkyl group with 1 to 12 carbon atoms and R$^{26}$ is a hydrogen or an alkyl groups having from 1 to 12 carbon atoms, wherein the subscripts a, b, c, d, e, f, g, h, i, j, k, l, m are zero or positive integers for molecules subject to the following limitations: 3≦a+b+c+d+e+f+g+h+i+j+k+l+m≦500, b+f+j≧1, c+g+k≧0, d+h+l≧1, and (a+b+c+d) equals 2+i+j+k+l+2m.

In a specific embodiment of the invention the polyorganosiloxane demulsifier according to the above-identified formula wherein R$^1$ is CH$_3$, OH or OCH$_3$; R$^2$, R$^3$, R$^5$, R$^6$, R$^8$, R$^9$, R$^{13}$, R$^{14}$, R$^{16}$, R$^{18}$, R$^{21}$ are CH$_3$; and R$^{11}$, R$^{12}$, R$^{20}$ are CH$_3$.

In a specific embodiment of the invention: R$^1$ is CH$_3$, OH or OCH$_3$; R$^2$, R$^3$, R$^5$, R$^6$, R$^8$, R$^9$, R$^{13}$, R$^{14}$, R$^{16}$, R$^{18}$, R$^{21}$ are CH$_3$, R$^{20}$ is an aryl having the formula (C$_r$H$_{2r}$)B and R$^{11}$, R$^{12}$ are either CH$_3$ or an aryl having the formula (C$_r$H$_{2r}$)B, with the proviso if the polyorganosiloxane contains diphenyl R$^{19}$ and R$^{20}$ are C$_6$H$_5$.

According to another specific embodiment of the invention, the demulsifier is a linear polyorganosiloxane according to the formula:

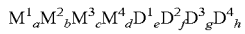

wherein:
M$^1$=R$^1$R$^2$R$^3$SiO$_{1/2}$
M$^2$=R$^4$R$^5$R$^6$SiO$_{1/2}$
M$^3$=R$^7$R$^8$R$^9$SiO$_{1/2}$
M$^4$=R$^{10}$R$^{11}$R$^{12}$SiO$_{1/2}$
D$^1$=R$^{13}$R$^{14}$SiO$_{2/2}$
D$^2$=R$^{15}$R$^{16}$SiO$_{2/2}$
D$^3$=R$^{17}$R$^{18}$SiO$_{2/2}$
D$^4$=R$^{19}$R$^{20}$SiO$_{2/2}$ and, R$^1$ is an alkyl group having from 1 to 12 carbon atoms, an OH or OR$^{25}$; R$^2$, R$^3$, R$^5$, R$^6$, R$^8$, R$^9$, R$^{13}$, R$^{14}$, R$^{16}$, R$^{18}$ are alkyl groups having from 1 to 12 carbon atoms; R$^4$, and R$^{15}$, are (C$_n$H$_{2n}$)—O—(C$_2$H$_4$O)$_o$—(C$_3$H$_6$O)$_p$—(C$_4$H$_8$O)$_q$—R$^{26}$; n equals 0 to 6, o equals 0 to 100, p equals 0 to 100 and q equals 0 to 50, provided o+p+q≧1; R$^7$ and R$^{17}$ are linear, branched or cyclic, saturated or unsaturated alkyl groups having from 4 to 36 carbon atoms; R$^{10}$ and R$^{19}$ are aryl groups having the general formula (C$_r$H$_{2r}$)B wherein r equals 0-30 and B is an aryl radical; R$^{11}$, R$^{12}$, R$^{20}$ are aryl groups having the general formula (C$_r$H$_{2r}$)B, wherein r equals 0 to 30 or an alkyl group having from 1 to 12 carbon atoms; R$^{25}$ is an alkyl group with 1 to 12 carbon atoms and R$^{26}$ is a hydrogen or an alkyl groups having from 1 to 12 carbon atoms, 3≦a+b+c+d+e+f+g+h≦500, b+f≧1, c+g≧0, d+h≧1, and a plus b plus c plus d equals 2.

According to one specific embodiment of the invention, the demulsifier is a polyorganosiloxane according to the structure:

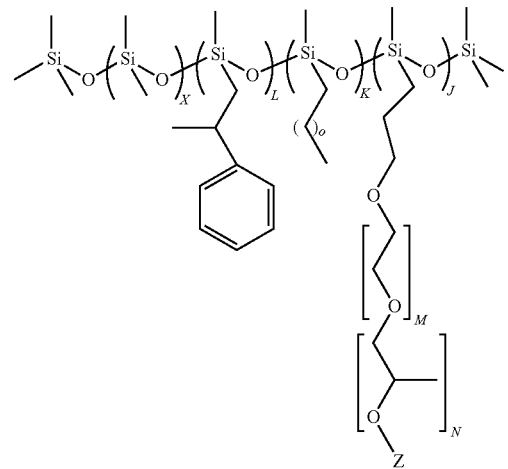

wherein X equals 1 to 498, L equals 1 to 300, K equals 0 to 300, J equals 1 to 300, M equals 0 to 100 N equals 0 to 100, and O equals 2 to 33 and Z is a hydrogen or an alkyl group having from 1 to 12 carbon atoms.

According to yet another embodiment of the invention the demulsifier is a branched polyorganosiloxane according to the formula:

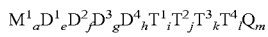

wherein
M$^1$=R$^1$R$^2$R$^3$SiO$_{1/2}$
D$^1$=R$^{13}$R$^{14}$SiO$_{2/2}$
D$^2$=R$^{15}$R$^{16}$SiO$_{2/2}$
D$^3$=R$^{12}$R$^{18}$SiO$_{2/2}$
D$^4$=R$^{19}$R$^{20}$SiO$_{2/2}$
T$^1$=R$^{21}$SiO$_{3/2}$
T$^2$=R$^{22}$SiO$_{3/2}$ $T^3=R^{23}SiO_{3/2}$
$T^4=R^{24}SiO_{3/2}$
$Q=SiO_{4/2}$ and, $R^1$ is an alkyl group having from 1 to 12 carbon atoms, an OH or $OR^{25}$; $R^2$, $R^3$, $R^{13}$, $R^{14}$, $R^{16}$, $R^{18}$, $R^{21}$ are alkyl groups having from 1 to 12 carbon atoms; $R^{15}$, $R^{22}$ are $(C_nH_{2n})$—O—$(C_2H_4O)_o$—$(C_3H_6O)_p$—$(C_4H_8O)_q$—$R^{26}$, n equals 0 to 6, o equals 0 to 100, p equals 0 to 100 and q equals 0 to 50, provided $o+p+q\geq 1$; $R^{17}$ and $R^{23}$ are linear, branched or cyclic, saturated or unsaturated alkyl groups having from 4 to 36 carbon atoms; $R^{19}$ and $R^{24}$ are aryl groups having the general formula $(C_rH_{2r})B$ wherein r equals 0-30 and B is an aryl radical; $R^{20}$ is an aryl group having the general formula $(C_rH_{2r})B$, wherein r equals 0 to 30 or an alkyl group having from 1 to 12 carbon atoms; $R^{25}$ is an alkyl group with 1 to 12 carbon atoms and $R^{26}$ is a hydrogen or an alkyl groups having from 1 to 12 carbon atoms, $i+j+k+l+m>0$; $a=2+i+j+k+l+2m$, $3\leq a+e+f+g+h+i+j+k+l+m\leq 500$, $f+j\geq 1$, $g+k\geq 0$, $h+l\geq 1$.

According to yet another specific embodiment of the invention, the demulsifier is a linear polyorganosiloxane according to the formula:

$$M^1D^1_eD^2_fD^3_gD^4_hM^1$$

wherein
$M^1=R^1R^2R^3SiO_{1/2}$
$D^1=R^{13}R^{14}SiO_{2/2}$
$D^2=R^{15}R^{16}SiO_{2/2}$
$D^3=R^{17}R^{18}SiO_{2/2}$
$D^4=R^{19}R^{20}SiO_{2/2}$ and, $R^1$ is an alkyl group having from 1 to 12 carbon atoms, an OH or $OR^{25}$; $R^2$, $R^3$, $R^3$, $R^{13}$, $R^{14}$, $R^{16}$, $R^{18}$ are alkyl groups having from 1 to 12 carbon atoms; $R^{15}$ is $(C_nH_{2n})$—O—$(C_2H_4O)_o$—$(C_3H_6O)_p$—$(C_4H_8O)_q$—$R^{26}$, n equals 0 to 6, o equals 0 to 6, o equals 0 to 100 and q equals 0 to 50, provided $o+p+q\geq 1$; $R^{17}$ is a linear, branched or cyclic, saturated or unsaturated alkyl groups having from 4 to 36 carbon atoms; and $R^{19}$ is an aryl group having the general formula $(C_rH_{2r})B$ wherein r equals 0-30 and B is an aryl radical; $R^{20}$ is an aryl group having the general formula $(C_rH_{2r})B$, wherein r equal 0 to 30 or an alkyl group having from 1 to 12 carbon atoms; $R^{25}$ is an alkyl group with 1 to 12 carbon atoms and $R^{26}$ is a hydrogen or an alkyl groups having from 1 to 12 carbon atoms, $1\leq e+f+g+h\leq 498$, $f\geq 1$, $g\geq 0$ and $h\geq 1$.

In a specific embodiment of the invention the polyorganosiloxane demulsifier according to the above-identified formula wherein $R^1$ is $CH_3$, OH or $OCH_3$; $R^2$, $R^3$, $R^{13}$, $R^{14}$, $R^{16}$, $R^{18}$ are $CH_3$; and $R^{20}$ is $CH_3$.

In a specific embodiment of the invention: $R^1$ is $CH_3$, OH or $OCH_3$; $R^2$, $R^3$, $R^{13}$, $R^{14}$, $R^{16}$, $R^{18}$ is an aryl having the formula $(C_rH_{2r})B$, with the proviso if the polyorganosiloxane contains diphenyl $R^{19}$ and $R^{20}$ are $C_6H_5$.

The polyorganosiloxane demulsifier described above is incorporated into the emulsion in a demulsifying-effective amount. A demulsifying-effective amount is an amount that causes the at least partial demulsification, i.e., at least partial separation, of the oil and water phases of the emulsion when used alone or with other demulsifying agent. In particular embodiments, the demulsifying-effective amount is, for example, a concentration in the range of about 0.1-10,000 ppm, or about 0.5-1,000 ppm, or about 5-500 ppm.

The polyorganosiloxane demulsifier described above can optionally be accompanied by one or more of any of the well-known organic demulsifiers commonly used in the art. Some classes of such commonly used organic demulsifiers include hydrocarbon group-containing sulfonic acids (e.g., dodecylbenzene sulfonic acid), carboxylic acids (e.g., fatty acids), thiocarboxylic acids (e.g., sodium dioctylsulfosuccinate, DOSS), carboxylic acid esters (e.g., fatty acid esters, adipate esters, fumarate esters, and their triol counterparts) phosphinic acids, sulfates (e.g., lauryl sulfate), and phosphates; alkyleneoxide polymers or copolymers and their esters (e.g., the ethylene oxide-propylene oxide copolymers and/or their combination with formaldehyde resins or di- or poly-amines); alkyleneoxide-functionalized phenolic resins (e.g., methylene linked butyl-, octyl-, or nonyl-phenols having EO-PO copolymer functionalization of phenolic groups, see, for example, U.S. Pat. Nos. 2,499,368, 2,499,370, 2,524, 889, and 2,560,333); epoxy resins (e.g., those derived from reaction of diglycidyl bis-phenol A with an alkylene glycol); diepoxides; amine alkyleneoxides (i.e., alkylene oxide-derivatized amines, e.g., oxyalkylated fatty amide and fatty amine derivatives disclosed in U.S. Pat. No. 5,421,993 or U.S. Publication No. 2005/0080221 (Ser. No. 684,250)); polyimine alkoxylates (see, for example, U.S. Pat. Nos. 3,907,701 and 4,387,028); polyester amines (e.g., EO, PO, and EO/PO copolymers condensed with oxylalkylated fatty amine and a dicarboxylic acid); cationic surfactants (e.g., based on quaternary amines or quaternary ethoxylated amines; see, for example, U.S. Pat. Nos. 3,974,220 and 4,451,671); bis-amides (see, for example, those disclosed in U.S. Pat. No. 4,536,339); and silicone-based polymers or copolymers lacking a combination of one or more alkylene oxide groups and one or more oxirane-containing and/or oxetane-containing groups (e.g., silicone polyethers as disclosed in U.S. Pat. No. 4,596,653 and alkylsilicone polyether terpolymers as disclosed in U.S. Pat. No. 5,004,559); and salts thereof.

When the organic demulsifier is included, the weight ratio of the polyorganosiloxane demulsifier (either the structures of this invention alone or in combination with other silicones, which are not part of this invention) to the organic demulsifier is typically in the range of about 100:1 to about 1:1000, more typically in the range of about 5:1 to about 1:200.

The incorporation of the demulsifier can be achieved by any method known in the art for integrally mixing the demulsifier with the emulsion. The mixing procedure can use, for example, standard mixers, high-speed mixers or blenders, or shakers. The temperature can be unadjusted within room temperature limits (~20-30° C.), or adjusted as required, for example, to 40-150° C. for a suitable amount of time.

According to another embodiment, when the polyorganosiloxane demulsifier of the invention is either used alone or accompanied by additional silicone and/or organic demulsifiers it can be as a blend, solution, a dispersion, or either an oil-in-water or a water-in-oil emulsion or microemulsion.

In another aspect, the invention is directed to a composition comprising the demulsifying-effective amount of polyorganosiloxane demulsifier, described above, and the components of the emulsion into which the polyorganosiloxane demulsifier was incorporated. For example, the composition can include the polyorganosiloxane demulsifier, an aqueous phase, and an oil phase.

According to another embodiment, a solid filler (e.g., drilling mud and the like can be included in the composition or method described above for breaking emulsions. By "solid filler" is meant solid materials in the form of particles, which is intentionally added to an emulsion or at least one of the liquid phases of the emulsion in order to fill a gap or modify the properties of the emulsion. Also contemplated within the scope of the invention are such residual or trace amounts of solids which correspond to the amounts typically encountered after substantial removal of solids by, for example, filtration. Such residual or trace amounts can remain and provide no function to the composition.

One method of producing component (a) i.e., the polyorganosiloxane demulsifier of the present invention is to react a molecule of the following formula:

$$M^H_x M^1_u D^H_y D^1_v D^4_h T^H_z T^1_w Q_m$$

wherein:

$M^H_x$, $D^H_y$, $T^H_z$, are the hydride precursors to the M, D and T structural units in the composition of the present invention, and $D^4_h$ is diphenyl-silicone, $(C_6H_5)_2SiO_{2/2}$, wherein the definitions and relationships are consistent with those defined above, under hydrosilylation conditions, with:

1. an olefinically modified polyalkyleneoxide;

such as allyloxypolyethyleneglycol, or methallyloxypolyalkyleneoxide, which are incorporated herein as examples, and not set forth to limit other possible olefinically modified alkyleneoxide components. As used herein the phrase "olefinically modified polyalkyleneoxide" is defined as a molecule possessing one or more alkyleneoxide groups containing one or more, terminal or pendant, carbon-carbon double bonds. The polyether is an olefinically modified polyalkyleneoxide (hereinafter referred to as "polyether") is described by the general formula:

$$CH_2=CH(R^{27})(R^{28})_sO-(C_2H_4O)_o-(C_3H_6O)_p-(C_4H_8O)_q-R^{26}$$

wherein; $R^{27}$ is H or methyl; $R^{28}$ is a divalent alkyl radical of 1 to 6 carbons where the subscript s may be 0 or 1. When the polyether is composed of mixed oxyalkyleneoxide groups (i.e. oxyethylene, oxypropylene and oxybutylene) the units may be blocked, or randomly distributed. One skilled in the art will understand the advantages of using a blocked or random configuration. Illustrative examples of blocked configurations are: -(oxyethylene)$_a$(oxypropylene)$_b$-; -(oxybutylene)$_c$(oxyethylene)$_a$-; and -(oxypropylene)$_b$(oxyethylene)$_a$(oxybutylene)$_c$-.

Illustrative examples of the polyether are provided below, but not limited to:
$CH_2=CHCH_2O(CH_2CH_2O)_8H$; $CH_2=CHCH_2O(CH_2CH_2O)_8CH_3$;
$CH_2=CHCH_2O(CH_2CH_2O)_4(CH_2CH(CH_3)O)_5H$;
$CH_2=CHO(CH_2CH_2O)_5(CH_2CH(CH_3)O)_5H$;
$CH_2=C(CH_3)CH_2O(CH_2CH_2O)_4(CH_2CH(CH_3)O)_5C(=O)CH_3$;
$CH_2=CHCH_2O(CH_2CH_2O)_5(CH_2CH(CH_3)O)_2(CH_2CH(CH_2CH_3)O)_2H$;

2. an olefinically modified aromatic:

As used herein the phrase "olefinically modified aromatic" is defined as a molecule possessing one or more aryl groups containing one or more, terminal or pendant, carbon-carbon double bonds, as described by the general formula:

$$CH_2=CH-B_1$$

wherein; $B_1$ is a monovalent aryl radical; and, 3. optionally, olefinically modified alkyl: As used herein the phrase "olefinically modified alkyl" is defined as a molecule possessing one or more alkyl groups containing one or more, terminal or pendant, carbon-carbon double bonds, as described by the general formula:

$$CH_2=CH-R^{29}$$

wherein; $R^{29}$ is a monovalent alkyl radical having from 1 to 10 carbon atoms or H.

Precious metal catalysts suitable for making organic-substituted siloxanes are also well known in the art and comprise complexes of rhodium, ruthenium, palladium, osmium, iridium, and/or platinum. Many types of platinum catalysts for this SiH olefin addition reaction are known and such platinum catalysts may be used to generate the compositions of the present invention. The platinum compound can be selected from those having the formula $(PtCl_2Olefin)$ and $H(PtCl_3Olefin)$ as described in U.S. Pat. No. 3,159,601, hereby incorporated by reference. A further platinum containing material can be a complex of chloroplatinic acid with up to 2 moles per gram of platinum of a member selected from the class consisting of alcohols, ethers, aldehydes and mixtures thereof as described in U.S. Pat. No. 3,220,972 hereby incorporated by reference. Yet another group of platinum containing materials useful in this present invention is described in U.S. Pat. Nos. 3,715,334; 3,775,452 and 3,814,730 (Karstedt). Additional background concerning the art may be found in J. L. Spier, "Homogeneous Catalysis of Hydrosilation by Transition Metals", in Advances in Organometallic Chemistry, volume 17, pages 407 through 447, F. G. A. Stone and R. West editors, published by Academic Press (New York, 1979). Those skilled in the art can easily determine an effective amount of platinum catalyst. Generally an effective amount ranges from about 0.1 to 50 parts per million of the total organomodified siloxane composition.

The following examples show that the demulsifying properties of the polyorganosiloxane copolymers, which are to be used pursuant to the invention, are superior to those known from the art, the examples being given by way of illustration and not by way of limitation.

Example 1

Preparation of $(CH_3)_3Si(OSi(CH_3)_2)_{75}(OSi(H)(CH_3))_{36}OSi(CH_3)_3$ Polymethylhydrogen-co-dimethylsiloxane fluid with average formula $(CH_3)_3Si(OSi(CH_3)_2)_{75}OSi(H)(CH_3))_{36}OSi(CH_3)_3$ was prepared by acid catalyzed ring opening polymerization of polymethylhydrogensiloxane with the average formula $(CH_3)_3Si(OSi(H)(CH_3))_{36}OSi(CH_3)_3$ and octamethylcyclotetrasiloxane ($D_4$, from Momentive Performance Materials, Wilton, Conn.) in the presence of Tulison TP63, an acidic ion exchange resin (IER, from Thermax Ltd, India). The reaction was carried out by mixing 216 g of $(CH_3)_3Si(OSi(H)(CH_3))_{36}OSi(CH_3)_3$, 555 g $D_4$ and 7.5 g of IER at 60° C. for 24 hrs in a round bottom flask fitted with a condenser. At the end of the reaction the IER was filtered out and the final non-volatile fraction in the resulting copolymer was found to be 92%. The average structure was determined by $^{29}Si$—NMR.

Example 2

Preparation of $(CH_3)_3Si(OSi(CH_3)_2)_{75}(OSi(H)(CH_3))_{13.3}OSi(CH_3)_3$ Polymethylhydrogen-co-dimethylsiloxane fluid with average formula $(CH_3)_3Si(OSi(CH_3)_2)_{75}(OSi(H)(CH_3))_{13.3}OSi(CH_3)_3$ was prepared by acid catalyzed ring opening polymerization of hexamethyldisiloxane (MM, from Sigma Aldrich, USA) polymethylhydrogensiloxane with the average formula $(CH_3)_3Si(OSi(H)(CH_3))_{36}OSi(CH_3)_3$ (from Momentive Performance Materials, Wilton, Conn.) and $D_4$, in the presence of Tulison TP63 IER. The reaction was carried out by mixing 10.2 g of MM, 216 g of $(CH_3)_3Si(OSi(H)(CH_3))_{36}OSi(CH_3)_3$, 555 g $D_4$ and 7.5 g of IER, at 50° C. for 24 hrs in a round bottom flask fitted with a condenser. At the end of the reaction the IER was filtered out and the final non-volatile fraction in the resulting copolymer was found to be 90%. The average structure was determined by $^{29}Si$-NMR

Example 3

Preparation of $(CH_3)_3Si(OSi(CH_3)_2)_2(OSi(C_6H_5)_2)_2(OSi(H)(CH_3))_{13.3}OSi(CH_3)_3$ Polymethylhydrogen-co-dimethylcodiphenylsiloxane terpolymer with average formula $(CH_3)_3Si(OSi(CH_3)_2)_2(OSi(C_6H_5)_2)_2(OSi(H)(CH_3))_{13.3}OSi(CH_3)_3$ was prepared by acid catalyzed ring opening polymerization Polydimethyl-co-diphenylsiloxane with the average formula $(CH_3)_3Si(OSi(CH_3)_2)_2(OSi(C_6H_5)_2)_2OSi(CH_3)_3$ (from Performance Materials, Wilton, Conn.) and tetramethylcyclotetrasiloxane ($D^H_4$, from Gelest, Tullytown, Pa.), in the presence of Tulison TP63 IER. The reaction was carried out by mixing 46.6 g of polydimethyl-co-diphenylsiloxane, 80 g $D^H_4$ and 1.5 g of IER at 80° C. for 24 hrs in a round bottom flask fitted with a condenser. At the end of the reaction the IER was filtered out and the final non-volatile fraction in the resulting copolymer was found to be 90%. The average structure was determined by $^{29}$Si-NMR

Example 4

Preparation of $(CH_3)_3Si(OSi(CH_3)_2)_2(OSi(H)(CH_3))_{14}OSi(CH_3)_3$ Polymethylhydrogen-co-dimethylsiloxane fluid with the average formula $(CH_3)_3Si(OSi(CH_3)_2)_2(OSi(H)(CH_3))_{14}OSi(CH_3)_3$ was prepared by acid catalyzed ring opening polymerization of MM, polymethylhydrogensiloxane with the average formula $(CH_3)_3Si(OSi(H)(CH_3))_{36}OSi(CH_3)_3$ (from Momentive Performance Materials, Wilton, Conn.) and $D_4$, in the presence of Tulison TP63 IER. The reaction was carried out by mixing 10 g of MM, 216 g of $(CH_3)_3Si(OSi(H)(CH_3))_{36}OSi(CH_3)_3$, 15 g $D_4$ and 2.5 g of IER at 50° C. for 24 hrs in a round bottom flask fitted with a condenser. At the end of the reaction the IER was filtered out and the final non-volatile fraction in the resulting copolymer was found to be 89%. The average structure was determined by $^{29}$Si-NMR

Example 5

Preparation of $(CH_3)_3Si(OSi(H)(CH_3))_{14}$ $OSi(CH_3)_3$ Polymethylhydrogen-co-dimethylsiloxane fluid with the average formula $(CH_3)_3Si(OSi(CH_3)_2)_2(OSi(H)(CH_3))_{14}OSi(CH_3)_3$ was prepared by acid catalyzed equilibration of MM and polymethylhydrogen-siloxane with the average formula $(CH_3)_3Si(OSi(H)(CH_3))_{36}OSi(CH_3)_3$ (from Momentive Performance Materials, Wilton, Conn.), in the presence of Tulison TP63 IER. The reaction was carried out by mixing 10 g of MM, 216 g of $(CH_3)_3Si(OSi(H)(CH_3))_{36}OSi(CH_3)_3$ and 2.5 g of IER at 50° C. for 24 hrs in a round bottom flask fitted with a condenser. At the end of the reaction the IER was filtered out and the final non-volatile fraction in the resulting copolymer was found to be 87%. The average structure was determined by $^{29}$Si-NMR.

Example 6

Preparation of $(CH_3)_3Si(OSi(CH_3)_2)_{85}(OSi(H)(CH_3))_{36}OSi(CH_3)_3$ Polymethylhydrogen-co-dimethylsiloxane fluid with the average formula $(CH_3)_3Si(OSi(CH_3)_2)_{75}(OSi(H)(CH_3))_{36}OSi(CH_3)_3$ was prepared by acid catalyzed ring opening polymerization of polymethylhydrogensiloxane with the average formula $(CH_3)_3Si(OSi(H)(CH_3))_{36}OSi(CH_3)_3$ (from Momentive Performance Materials, Wilton, Conn.) and $D_4$, in the presence of Tulison TP63 IER. The reaction was carried out by mixing 216 g of $(CH_3)_3Si(OSi(H)(CH_3))_{36}OSi(CH_3)_3$, 630 g of $D_4$ and 7.5 g of IER at 60° C. for 24 hrs in a round bottom flask fitted with a condenser. At the end of the reaction the IER was filtered out and the final non-volatile fraction in the resulting copolymer was found to be 90%. The average structure was determined by $^{29}$Si-NMR.

Example 7

Preparation of $(CH_3)_3SiO(Si(CH_3)_2O)_{75}(Si(R^2)(CH_3)O)_2(Si(R_3)(CH_3)O)_{20}(Si(R^4)(CH_3)O)_{14}Si(CH_3)_3$ In the above formula, $R^2$ is a polyether copolymers having the average formula—$CH_2CH_2CH_2(OCH_2CH_2)_8OH$, $R^3$ is a n-octyl group and $R^4$ is 2-phenylpropyl radical.

This laboratory prepared material is obtained from the hydrosilylation reaction between Example 1, 1-octene, alpha-methylstyrene (AMS) and a polyether with the average formula of $CH_2=CHCH_2(OCH_2CH_2)_8OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 8.4 g of AMS was added to the reaction vessel. The reaction was exothermic and the reactor temperature rose to 100° C. within 2 minutes. The reaction was continued till all the AMS was consumed (as confirmed by H-NMR). Then 4.9 g of allyl polyether above was charged into the reactor followed by immediate addition of 11.4 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 8

Preparation of $(CH_3)_3SiO(Si(CH_3)_2O)_{75}(Si(R^2)(CH_3)O)_{3.5}(Si(R^3)(CH_3)O)_{23.5}(Si(R^4)(CH_3)O)_{10}Si(CH_3)_3$ In the above formula, $R^2$ is a polyether copolymers having the average formula—$CH_2CH_2CH_2(OCH_2CH_2)_8OH$, $R^3$ is a n-octyl group and $R^4$ is 2-phenylpropyl radical.

This laboratory prepared material is obtained from the hydrosilylation reaction between Example 1, 1-octene, alpha-methylstyrene (AMS) and a polyether with the average formula of $CH_2=CHCH_2(OCH_2CH_2)_8OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 6.0 g of AMS was added to the reaction vessel. The reaction was exothermic and the reactor temperature rose to 100° C. within 2 minutes. The reaction was continued till all the AMS was consumed (as confirmed by H-NMR). Then 8.5 g of allyl polyether above was charged into the reactor followed by immediate addition of 13.3 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 9

Preparation of $(CH_3)_3SiO(Si(CH_3)_2O)_{75}(Si(R^2)(CH_3)O)_{5.75}(Si(R^3)(CH_3)O)_{23.8}(Si(R^4)(CH_3)O)_{6.5}Si(CH_3)_3$ In the above formula, $R^2$ is a polyether copolymers having the average formula—$CH_2CH_2CH_2(OCH_2CH_2)_8OH$, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2\!\!=\!\!CHCH_2(OCH_2CH_2)_8 OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 3.9 g of AMS was added to the reaction vessel. The reaction was exothermic and the reactor temperature rose to 100° C. within 2 minutes. The reaction was continued till all the AMS was consumed (as confirmed by H-NMR). Then 14.1 g of allyl polyether above was charged into the reactor followed by immediate addition of 13.3 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 10

Preparation of $(CH_3)_3SiO(Si(CH_3)_2O)_{75}(Si(R^2)(CH_3)O)_7(Si(R^3)(CH_3)O)_{25.4}(Si(R^4)(CH_3)O)_{3.6}Si(CH_3)$ In the above formula, $R^2$ is a polyether copolymers having the average formula—$CH_2CH_2CH_2(OCH_2CH_2)_8OH$, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2\!\!=\!\!CHCH_2(OCH_2CH_2)_8 OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 2.2 g of AMS was added to the reaction vessel. The reaction was exothermic and the reactor temperature rose to 100° C. within 2 minutes. The reaction was continued till all the AMS was consumed (as confirmed by H-NMR). Then 17.1 g of allyl polyether above was charged into the reactor followed by immediate addition of 14.5 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 11

Preparation of $(CH_3)_3SiO(Si(CH_3)_2O)_{75}(Si(R^2)(CH_3)O)_{10.8}(Si(R^3)(CH_3)O)_{21.6}(Si(R^4)(CH_3)O)_{3.6}Si(CH_3)_3$ In the above formula, $R^2$ is a polyether copolymers having the average formula—$CH_2CH_2CH_2(OCH_2CH_2)_8OH$, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2\!\!=\!\!CHCH_2(OCH_2CH_2)_8 OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 2.2 g of AMS was added to the reaction vessel. The reaction was exothermic and the reactor temperature rose to 100° C. within 2 minutes. The reaction was continued till all the AMS was consumed (as confirmed by H-NMR). Then 26.4 g of allyl polyether above was charged into the reactor followed by immediate addition of 12.3 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 12

Preparation of $(CH_3)_3SiO(Si(CH_3)_2O)_{75}(Si(R^2)(CH_3)O)_{10.8}(Si(R^3)(CH_3)O)_{10.8}(Si(R^4)(CH_3)O)_{14.4}Si(CH_3)_3$ In the above formula, $R^2$ is a polyether copolymers having the average formula—$CH_2CH_2CH_2(OCH_2CH_2)_8OH$, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2\!\!=\!\!CHCH_2(OCH_2CH_2)_8 OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 8.6 g of AMS was added to the reaction vessel. The reaction was exothermic and the reactor temperature rose to 100° C. within 2 minutes. The reaction was continued till all the AMS was consumed (as confirmed by H-NMR). Then 26.4 g of allyl polyether above was charged into the reactor followed by immediate addition of 6.1 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 13

Preparation of $(CH_3)_3SiO(Si(CH_3)_2O)_{75}(Si(R^2)(CH_3)O)_{10.8}(Si(R^3)(CH_3)O)_5(Si(R^4)(CH_3)O)_{21}Si(CH_3)_3$ In the above formula, $R^2$ is a polyether copolymers having the average formula—$CH_2CH_2CH_2(OCH_2CH_2)_8OH$, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2=CHCH_2(OCH_2CH_2)_8OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 12.5 g of AMS was added to the reaction vessel. The reaction was exothermic and the reactor temperature rose to 100° C. within 2 minutes. The reaction was continued till all the AMS was consumed (as confirmed by H-NMR). Then 26.4 g of allyl polyether above was charged into the reactor followed by immediate addition of 2.8 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 14

Preparation of $(CH_3)_3SiO(Si(CH_3)_2O)_{75}(Si(R^2)(CH_3)O)_{10.8}(Si(R^3)(CH_3)O)_{16.2}(Si(R^4)(CH_3)O)_9Si(CH_3)_3$ In the above formula, $R^2$ is a polyether copolymers having the average formula—$CH_2CH_2CH_2(OCH_2CH_2)_8OH$, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2=CHCH_2(OCH_2CH_2)_8OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 5.4 g of AMS was added to the reaction vessel. The reaction was exothermic and the reactor temperature rose to 100° C. within 2 minutes. The reaction was continued till all the AMS was consumed (as confirmed by H-NMR). Then 26.4 g of allyl polyether above was charged into the reactor followed by immediate addition of 9.2 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 15

Preparation of $(CH_3)_3SiO(Si(CH_3)_2O)_{75}(Si(R^2)(CH_3)O)_{16.2}(Si(R^3)(CH_3)O)_{5.4}(Si(R^4)(CH_3)O)_{14.4}Si(CH_3)_3$ In the above formula, $R^2$ is a polyether copolymers having the average formula—$CH_2CH_2CH_2(OCH_2CH_2)_8OH$, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2=CHCH_2(OCH_2CH_2)_8OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 8.6 g of AMS was added to the reaction vessel. The reaction was exothermic and the reactor temperature rose to 100° C. within 2 minutes. The reaction was continued till all the AMS was consumed (as confirmed by H-NMR). Then 39.6 g of allyl polyether above was charged into the reactor followed by immediate addition of 3.1 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 16

Preparation of $(CH_3)_3SiO(Si(CH_3)_2O)_{75}(Si(R^2)(CH_3)O)_{21.6}(Si(R^3)(CH_3)O)_{5.4}(Si(R^4)(CH_3)O)_9Si(CH_3)_3$ In the above formula, $R^2$ is a polyether copolymers having the average formula—$CH_2CH_2CH_2(OCH_2CH_2)_8OH$, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2=CHCH_2(OCH_2CH_2)_8OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 5.4 g of AMS was added to the reaction vessel. The reaction was exothermic and the reactor temperature rose to 100° C. within 2 minutes. The reaction was continued till all the AMS was consumed (as confirmed by H-NMR). Then 52.8 g of allyl polyether above was charged into the reactor followed by immediate addition of 3.1 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 17

Preparation of $(CH_3)_3SiO(Si(CH_3)_2O)_{75}(Si(R^2)(CH_3)O)_{21.6}(Si(R^3)(CH_3)O)_{10.8}(Si(R^4)(CH_3)O)_{3.6}Si(CH_3)_3$ In the above formula, $R^2$ is a polyether copolymers having the average formula—$CH_2CH_2CH_2(OCH_2CH_2)_8OH$, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2=CHCH_2(OCH_2CH_2)_8OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 2.2 g of AMS was added to the reaction vessel. The reaction was exothermic and the reactor temperature rose to 100° C. within 2 minutes. The reaction was continued till all the AMS was consumed (as confirmed by H-NMR). Then 52.8 g of allyl polyether above was charged into the reactor followed by immediate addition of 6.1 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 18

Preparation of $(CH_3)_3SiO(Si(CH_3)_2O)_{75}(Si(R^2)(CH_3)O)_{21.6}(Si(R^4)(CH_3)O)^{14.4}Si(CH_3)_3$ In the above formula, $R^2$ is a polyether copolymers having the average formula—$CH_2CH_2CH_2(OCH_2CH_2)_8OH$ and $R^4$ is 2-phenylpropyl radical.

This laboratory prepared material is obtained from the hydrosilylation reaction between polysiloxane hydride from Example 1, AMS and a polyether with the average formula of $CH_2=CHCH_2(OCH_2CH_2)_8OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 8.6 g of AMS was added to the reaction vessel. The reaction was exothermic and the reactor temperature rose to 100° C. within 2 minutes. The reaction was continued till all the AMS is consumed (as confirmed by H-NMR). Then 52.8 g of allyl polyether above were charged into the reactor followed by immediate addition of 50 mL of toluene containing Karstedt's catalyst equivalent to 5 ppm of Platinum to the reactor. This reaction was also exothermic and temperature increased to about 100° C. Reaction mixture turns from a heterogeneous system to a homogeneous one and was continued at 100° C. for another five hours when all the hydrides were consumed (as confirmed by H-NMR). Solvent was removed under reduced pressure and the copolymer was allowed to cool with stirring in the reactor for 30 minutes and then removed.

Example 19

Preparation of $(CH_3)_3SiO(Si(CH_3)_2O)_{75}(Si(R^2)(CH_3)O)_{21.6}(Si(R^4)(CH_3)O)_{14.4}Si(CH_3)_3$ In the above formula, $R^2$ is a polyether copolymers having the average formula—$CH_2CH_2CH_2(OCH_2CH_2)_{12}OH$ and $R^4$ is 2-phenylpropyl radical.

This laboratory prepared material is obtained from the hydrosilylation reaction between polysiloxane hydride from Example 1, AMS and a polyether with the average formula of $CH_2=CHCH_2(OCH_2CH_2)_{12}OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 8.6 g of AMS was added to the reaction vessel. The reaction was exothermic and the reactor temperature rose to 100° C. within 2 minutes. The reaction was continued till all the AMS is consumed (as confirmed by H-NMR). Then 81.3 g of allyl polyether above were charged into the reactor followed by immediate addition of 50 mL of toluene containing Karstedt's catalyst equivalent to 5 ppm of Platinum to the reactor. This reaction was also exothermic and temperature increased to about 100° C. Reaction mixture turns from a heterogeneous system to a homogeneous one and was continued at 100° C. for another five hours when all the hydrides were consumed (as confirmed by H-NMR). Solvent was removed under reduced pressure and the copolymer was allowed to cool with stirring in the reactor for 30 minutes and then removed.

Example 20

Preparation of $(CH_3)_3SiO(Si(CH_3)_2O)_{75}(Si(R^2)(CH_3)O)_{21.6}(Si(R^3)(CH_3)O)_{5.4}(Si(R^4)(CH_3)O)_{9.9}Si(CH_3)_3$ In the above formula, $R^2$ is a polyether copolymers having the average formula—$CH_2CH_2CH_2(OCH_2CH_2)_{12}(OCH_2CH(CH_3))_4$ OH, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2=CHCH_2(OCH_2CH_2)_{12}(OCH_2CH(CH_3))_4OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 5.9 g of AMS was added to the reaction vessel. The reaction was exothermic and the reactor temperature rose to 100° C. within 2 minutes. The reaction was continued till all the AMS was consumed (as confirmed by H-NMR). Then 106.3 g of allyl polyether above was charged into the reactor followed by immediate addition of 3.1 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 21

Preparation of $(CH_3)_3SiO(Si(CH_3)_2O)_{75}(Si(R^2)(CH_3)O)_{21.6}(Si(R^3)(CH_3)O)_{3.4}(Si(R^4)(CH_3)O)_{9.9}Si(CH_3)_3$ In the above formula, $R^2$ is a polyether copolymers having the average formula—$CH_2CH_2CH_2(OCH_2CH_2)_{12}(OCH_2CH(CH_3))_{15}$ OH, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2=CHCH_2(OCH_2CH_2)_{12}(OCH_2CH(CH_3))_{15}OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 5.9 g of AMS was added to the reaction vessel. The reaction was exothermic and the reactor temperature rose to 100° C. within 2 minutes. The reaction was continued till all the AMS was consumed (as confirmed by H-NMR). Then 225.3 g of allyl polyether above was charged into the reactor followed by immediate addition of 3.1 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 22

Preparation of $(CH_3)_3SiO(Si(CH_3)_2O)_{75}(Si(R^2)(CH_3)O)_{16.2}(Si(R^3)(CH_3)O)_{5.4}(Si(R^4)(CH_3)O)_{14.4}Si(CH_3)_3$ In the above formula, $R^2$ is a polyether copolymers having the average formula—$CH_2CH_2CH_2(OCH_2CH_2)_{12}(OCH_2CH(CH_3))_4OH$, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2=CHCH_2(OCH_2CH_2)_{12}(OCH_2CH(CH_3))_4OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 8.6 g of AMS was added to the reaction vessel. The reaction was exothermic and the reactor temperature rose to 100° C. within 2 minutes. The reaction was continued till all the AMS was consumed (as confirmed by H-NMR). Then 80.3 g of allyl polyether above was charged into the reactor followed by immediate addition of 3.1 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 23

Preparation of $(CH_3)_3SiO(Si(CH_3)_2O)_{75}(Si(R^2)(CH_3)O)_{16.2}(Si(R^3)(CH_3)O)_{5.4}(Si(R^4)(CH_3)O)_{14.4}Si(CH_3)_3$ In the above formula, $R^2$ is a polyether copolymers having the average formula—$CH_2CH_2CH_2(OCH_2CH_2)_{12}(OCH_2CH(CH_3))_{15}OH$, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2=CHCH_2(OCH_2CH_2)_{12}(OCH_2CH(CH_3))_{15}OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 8.6 g of AMS was added to the reaction vessel. The reaction was exothermic and the reactor temperature rose to 100° C. within 2 minutes. The reaction was continued till all the AMS was consumed (as confirmed by H-NMR). Then 176 g of allyl polyether above was charged into the reactor followed by immediate addition of 3.1 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 24

Preparation of $(CH_3)_3SiO(Si(CH_3)_2O)_{75}(Si(R^2)(CH_3)O)_{16.2}(Si(R^3)(CH_3)O)_{5.4}(Si(R^4)(CH_3)O)_{14.4}Si(CH_3)_3$ In the above formula, $R^2$ is a polyether copolymers having the average formula—$CH_2CH_2CH_2(OCH_2CH_2)_{36}(OCH_2CH(CH_3))_{41}OH$, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2=CHCH_2(OCH_2)_{36}(OCH_2CH(CH_3))_{41}OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 8.6 g of AMS was added to the reaction vessel. The reaction was exothermic and the reactor temperature rose to 100° C. within 2 minutes. The reaction was continued till all the AMS was consumed (as confirmed by H-NMR). Then 379 g of allyl polyether above was charged into the reactor followed by immediate addition of 3.1 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 25

Preparation of $(CH_3)_3SiO(Si(CH_3)_2O)_{75}Si(R^2)(CH_3)O)_{5.2}(Si(R^3)(CH_3)O)_6(Si(R^4)(CH_3)O)_2Si(CH_3)_3$ In the above formula, $R^2$ is a mixture of two polyether copolymers having the average formulas —$CH_2CH_2CH_2(OCH_2CH_2)_{12}(OCH(CH_3)CH_2)_{15}OH$ and —$CH_2CH_2CH_2$—$(OCH_2CH_2)_{36}(OCH(CH_3)CH_2)_{41}OH$ such that the combined average molecular weight is approximately 2250 g/mol, $R^3$ is a n-octyl group and $R^4$ is 2-phenylpropyl radical.

This laboratory prepared material is obtained from the hydrosilylation reaction between polysiloxane hydride from Example 2, 1-octene, alphamethylstyrene (AMS) and blend of polyethers with the average formula of $CH_2=CHCH_2(OCH_2CH_2)_{12}(OCH_2CH(CH_3))_{15}OH$ and $CH_2=CHCH_2(OCH_2CH_2)_{36}(OCH_2CH(CH_3))_{41}OH$ in 3:1 molar ratio. A nitrogen blanketed glass reactor at atmospheric pressure, which was equipped with a temperature probe, an agitator, a condenser and a nitrogen inlet, was charged with 40 g of polysiloxane hydride from Example 2. The reactor was heated to 74° C. and Karstedt's catalyst equivalent to 5 ppm of Platinum was dissolved in 1.5 g of AMS was added to the reaction vessel. The reaction was exothermic and the reactor temperature rose to 100° C. within 2 minutes. The reaction was continued till all the AMS was consumed (as confirmed by H-NMR). Then 106.8 g of allyl polyether above was charged into the reactor followed by immediate addition of 4.1 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 26

Preparation of $(CH_3)_3SiO(Si(CH_3)_2O)_{75}(Si(R^2)(CH_3)O)_8(Si(R^3)(CH_3)O)_4(Si(R^4)(CH_3)O)_{1.2}Si(CH_3)_3$ In the above formula, $R^2$ is a mixture of two polyether copolymers having the average formulas —$CH_2CH_2CH_2(OCH_2CH_2)_{12}(OCH(CH_3)CH_2)_{15}OH$ and —$CH_2CH_2CH_2$—$(OCH_2CH_2)_{36}(OCH(CH_3)CH_2)_{41}OH$ such that the combined average molecular weight is approximately 2250 g/mol, $R^3$ is a n-octyl group and $R^4$ is 2-phenylpropyl radical.

This laboratory prepared material is obtained from the hydrosilylation reaction between polysiloxane hydride from Example 2, 1-octene, alphamethylstyrene (AMS) and blend of polyethers with the average formula of $CH_2$=$CHCH_2(OCH_2CH_2)_{12}(OCH_2CH(CH_3))_{15}OH$ and $CH_2$=$CHCH_2(OCH_2CH_2)_{36}(OCH_2CH(CH_3))_{41}OH$ in 3:1 molar ratio. A nitrogen blanketed glass reactor at atmospheric pressure, which was equipped with a temperature probe, an agitator, a condenser and a nitrogen inlet, was charged with 40 g of polysiloxane hydride from Example 2. The reactor was heated to 74° C. and Karstedt's catalyst equivalent to 5 ppm of Platinum was dissolved in 0.9 g of AMS was added to the reaction vessel. The reaction was exothermic and the reactor temperature rose to 100° C. within 2 minutes. The reaction was continued till all the AMS was consumed (as confirmed by H-NMR). Then 164.4 g of allyl polyether above was charged into the reactor followed by immediate addition of 2.8 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 27

Preparation of $(CH_3)_3SiO(Si(CH_3)_2O)_2(Si(R^2)(CH_3)O)_6(Si(R^3)(CH_3)O)_6(SiR^4_2O)_2Si(CH_3)_3$ In the above formula, $R^2$ is a polyether copolymers having the average formula—$CH_2CH_2CH_2(OCH_2CH_2)_{12}OH$, $R^3$ is a n-octyl group and $R^4$ is phenyl radical.

This laboratory prepared material is obtained from the hydrosilylation reaction between polysiloxane hydride from Example 3, 1-octene and a polyether with the average formula of $CH_2$=$CHCH_2(OCH_2CH_2)_{12}OH$. A nitrogen blanketed glass reactor at atmospheric pressure, which was equipped with a temperature probe, an agitator, a condenser and a nitrogen inlet, was charged with 40 g of polysiloxane hydride from Example 3. The reactor was heated to 74° C. and 137 g of allyl polyether above was charged into the reactor followed by immediate addition of 20.7 g of 1-octene containing Karstedt's catalyst equivalent to 10 ppm of Platinum to the reactor. This reaction was also exothermic and temperature increased to about 100° C. Reaction mixture turns from a heterogeneous system to a homogeneous one and was continued at 100° C. for another four hours when all the hydrides were consumed (as confirmed by H-NMR).

Example 28

Preparation of $(CH_3)_3SiO(Si(CH_3)_2O)_2(Si(R^2)(CH_3)O)_6(Si(R^3)(CH_3)O)_6(SiR^4_2O)_2Si(CH_3)_3$ In the above formula, $R^2$ is a polyether copolymers having the average formula—$CH_2CH_2CH_2(OCH_2CH_2)_8OH$, $R^3$ is a n-octyl group and $R^4$ is phenyl radical.

This laboratory prepared material is obtained from the hydrosilylation reaction between polysiloxane hydride from Example 3, 1-octene and a polyether with the average formula of $CH_2$=$CHCH_2(OCH_2CH_2)_8OH$. A nitrogen blanketed glass reactor at atmospheric pressure, which was equipped with a temperature probe, an agitator, a condenser and a nitrogen inlet, was charged with 40 g of polysiloxane hydride from Example 3. The reactor was heated to 74° C. and 88.9 g of allyl polyether above was charged into the reactor followed by immediate addition of 20.7 g of 1-octene containing Karstedt's catalyst equivalent to 10 ppm of Platinum to the reactor. This reaction was also exothermic and temperature increased to about 100° C. Reaction mixture turns from a heterogeneous system to a homogeneous one and was continued at 100 C for another four hours when all the hydrides were consumed (as confirmed by H-NMR).

Example 29

Preparation of $(CH_3)_3SiO(Si(CH_3)_2O)_2(Si(R^2)(CH_3)O)_6(Si(R^3)(CH_3)O)_6(SiR^4_2O)_2Si(CH_3)_3$ In the above formula, $R^2$ is a polyether copolymers having the average formula—$CH_2CH_2CH_2(OCH_2CH_2)_{12}(OCH_2CH(CH_3))_4OH$, $R^3$ is a n-octyl group and $R^4$ radical.

This laboratory prepared material is obtained from the hydrosilylation reaction between polysiloxane hydride from Example 3, 1-octene and a polyether with the average formula of $CH_2$=$CHCH_2(OCH_2CH_2)_{12}(OCH_2CH(CH_3))_4OH$. A nitrogen blanketed glass reactor at atmospheric pressure, which was equipped with a temperature probe, an agitator, a condenser and a nitrogen inlet, was charged with 40 g of polysiloxane hydride from Example 3. The reactor was heated to 74° C. and 180 g of allyl polyether above was charged into the reactor followed by immediate addition of 20.7 g of 1-octene containing Karstedt's catalyst equivalent to 10 ppm of Platinum to the reactor. This reaction was also exothermic and temperature increased to about 100° C. Reaction mixture turns from a heterogeneous system to a homogeneous one and was continued at 100° C. for another four hours when all the hydrides were consumed (as confirmed by H-NMR).

Example 30

Preparation of $(CH_3)_3SiO(Si(CH_3)_2O)_2(Si(R^2)(CH_3)O)_6(Si(R^3)(CH_3)O)_6(Si(R^4)(CH_3)O)_2Si(CH_3)_3$ In the above formula, $R^2$ is a polyether copolymers having the average formula—$CH_2CH_2CH_2(OCH_2CH_2)_{12}OH$, $R^3$ is a n-octyl group and $R^4$ is 2-phenylpropyl radical This laboratory prepared material was obtained from the hydrosilylation reaction between polysiloxane hydride from Example 4, 1-octene, alphamethylstyrene (AMS) and a polyether with the average formula of $CH_2$=$CHCH_2(OCH_2CH_2)_{12}OH$. A nitrogen blanketed glass reactor at atmospheric pressure, which was equipped with a temperature probe, an agitator, a condenser and a nitrogen inlet, was charged with 40 g of polysiloxane hydride from Example 4. The reactor was heated to 74° C. and Karstedt's catalyst equivalent to 5 ppm of Platinum was dissolved in 8.2 g of AMS was added to the reaction vessel. The reaction was exothermic and the reactor temperature rose to 100° C. within 2 minutes. The reaction was continued till all the AMS was consumed (as confirmed by H-NMR). Then 158 g of allyl polyether above was charged into the reactor followed by immediate addition of 23.4 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 31

Preparation of $(CH_3)_3SiO(Si(R^2)(CH_3)O)_6(Si(R^3)(CH_3)O)_6(Si(R^4)(CH_3)O)_4Si(CH_3)_3$ In the above formula, $R^2$ is a polyether copolymers having the average formula— $CH_2CH_2CH_2(OCH_2CH_2)_{12}OH$, $R^3$ is a n-octyl group and $R^4$ is 2-phenylpropyl radical This laboratory prepared material is obtained from the hydrosilylation reaction between polysiloxane hydride from Example 5, 1-octene, alphamethylstyrene (AMS) and a polyether with the average formula of $CH_2=CHCH_2(OCH_2CH_2)_{12}(OCH_2CH(CH_3))_{15}OH$. A nitrogen blanketed glass reactor at atmospheric pressure, which was equipped with a temperature probe, an agitator, a condenser and a nitrogen inlet, was charged with 40 g of polysiloxane hydride from Example 5. The reactor was heated to 74° C. and Karstedt's catalyst equivalent to 5 ppm of Platinum was dissolved in 16.8 g of AMS was added to the reaction vessel. The reaction was exothermic and the reactor temperature rose to 100° C. within 2 minutes. The reaction was continued till all the AMS was consumed (as confirmed by H-NMR). Then 158 g of allyl polyether above was charged into the reactor followed by immediate addition of 23.9 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 32

Preparation of $(CH_3)_3SiO(Si(CH_3)_2O)_{85}(Si(R^2)(CH_3)O)_{8.5}(Si(R^3)(CH_3)O)_{22.5}(Si(R^4)(CH_3)O)_5Si(CH_3)_3$ In the above formula, $R^2$ is a polyether copolymers having the average formula— $CH_2CH_2CH_2(OCH_2CH_2)_8OCH_3$, $R^3$ is a n-octyl group and $R^4$ is 2-phenylpropyl radical.

This laboratory prepared material is obtained from the hydrosilylation reaction between polysiloxane hydride from Example 6, 1-octene, alphamethylstyrene (AMS) and a polyether with the average formula of $CH_2=CHCH_2(OCH_2CH_2)_8 OCH_3$. A nitrogen blanketed glass reactor at atmospheric pressure, which was equipped with a temperature probe, an agitator, a condenser and a nitrogen inlet, was charged with 40 g of polysiloxane hydride from Example 6. The reactor was heated to 74° C. and Karstedt's catalyst equivalent to 5 ppm of Platinum was dissolved in 2.7 g of AMS was added to the reaction vessel. The reaction was exothermic and the reactor temperature rose to 100° C. within 2 minutes. The reaction was continued till all the AMS was consumed (as confirmed by H-NMR). Then 20 g of allyl polyether above was charged into the reactor followed by immediate addition of 11.7 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 33

Preparation of $(CH_3)_3SiO(Si(CH_3)_2O)_{75}(Si(R^2)(CH_3)O)_{5.2}(Si(R^3)(CH_3)O)_{25.8}(Si(R^4)(CH_3)O)_5Si(CH_3)_3$ In the above formula, $R^2$ is a polyether copolymers having the average formula— $CH_2CH_2CH_2(OCH_2CH_2)_8OH$, $R^3$ is a n-octyl group and $R^4$ is 2-phenylpropyl radical.

This laboratory prepared material is obtained from the hydrosilylation reaction between polysiloxane hydride from Example 1, 1-octene, alphamethylstyrene (AMS) and a polyether with the average formula of $CH_2=CHCH_2(OCH_2CH_2)_8 OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst equivalent to 5 ppm of Platinum was dissolved in 3 g of AMS was added to the reaction vessel The reaction was exothermic and the reactor temperature rose to 100° C. within 2 minutes. The reaction was continued till all the AMS was consumed (as confirmed by H-NMR). Then 12.7 g of allyl polyether above was charged into the reactor followed by immediate addition of 14.7 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

Example 34

Preparation of $((CH_3)_3SiO_{1/2})_{2.5}(OSi(CH_3)_2)_{75}(OSi(H)(CH_3))_{36}(SiO_2)$ Branched polymethylhydrogen-co-dimethylsiloxane fluid with the above average formula was prepared by acid catalyzed ring opening polymerization of polymethylhydrogensiloxane with the average formula $(CH_3)_3Si(OSi(H)(CH_3))_{36}OSi(CH_3)_3$, MQ resin, with the average formula $((CH_3)_3SiO_{1/2})_{1.0}(SiO_2)_{1.0}$ and a viscosity of 1000-20000 cSt and $D_4$ (all from Momentive Performance Materials, Wilton, Conn.), in the presence of Tulison TP63 IER. The reaction was carried out by mixing 216 g of $(CH_3)_3Si(OSi(H)(CH_3))_{36}OSi(CH_3)_3$, 555 g $D_4$, 22.2 g of MQ resin and 7.5 g of TP63 IER at 80° C. for 24 hrs in a round bottom flask fitted with a condenser. At the end of the reaction the TP63 IER was filtered out and the final non-volatile fraction in the resulting copolymer was found to be 88%. The average structure was determined by $^{29}$Si-NMR.

Example 35

Preparation of $((CH_3)_3SiO)_{2.5}(Si(CH_3)_2O)_{75}(Si(R^2)(CH_3)O)_{16.2}(Si(R^3)(CH_3)O)_{5.4}(Si(R^4)(CH_3)O)_{14.4}(SiO_2)$ In the above formula, $R^2$ is a polyether copolymers having the average formula—$CH_2CH_2CH_2(OCH_2CH_2)_8OH$, $R^3$ is a n-octyl group and $R^4$ is 2-phenylpropyl radical.

This laboratory prepared material is obtained from the hydrosilylation reaction between polysiloxane hydride from Example 34, 1-octene, alphamethylstyrene (AMS) and a polyether with the average formula of $CH_2=CHCH_2(OCH_2CH_2)_8OH$. A nitrogen blanketed glass reactor at atmospheric pressure, which was equipped with a temperature probe, an agitator, a condenser and a nitrogen inlet, was charged with 40 g of polysiloxane hydride from Example 1. The reactor was heated to 74° C. and Karstedt's catalyst, equivalent to 5 ppm of Platinum was dissolved in 8.6 g of AMS was added to the reaction vessel. The reaction was exothermic and the reactor temperature rose to 100° C. within 2 minutes. The reaction was continued till all the AMS was consumed (as confirmed by H-NMR). Then 39.6 g of allyl polyether above was charged into the reactor followed by immediate addition of 3.1 g of 1-octene containing Karstedt's catalyst equivalent to 5 ppm of Platinum to the reactor. This reaction was also exothermic and the temperature increased to about 110° C. The reaction mixture turned from a heterogeneous system to a homogeneous one and the heating was continued at 100° C. for another three hours until all the hydrides were consumed (as confirmed by H-NMR). The copolymer was allowed to cool with stirring in the reactor for 30 minutes and then removed.

DEMULSIFIER EFFICIENCY TESTS WITH CRUDE OILS

In the following examples tests of the new silicones structures, alone and in combinations with each other, with organic demulsifiers and with other silicone demulsifiers will be described.

The organic demulsifiers were:

ORG A: Kemelix 3551X, a modified alkoxylate, with 100% actives, available from Croda, East Yorkshire, UK.

ORG B: Voranol CP6001, a polyether polyol, available from Dow Chemical Co., Midland, Mich.

ORG C: Voranol EP1900, a polyether polyol, available from Dow Chemical Co., Midland, Mich.

ORG D: Kemelix D501, an alkoxylated ethylenediamine, with 100% actives, available from Croda, East Yorkshire, UK.

ORG E: Kemelix 3422X, a polymeric alkoxylate, with 100% actives, available from Croda, East Yorkshire, UK.

ORG F: Kemelix 3515X, a polymeric alkoxylate, with 100% actives, available from Croda, East Yorkshire, UK.

ORG G: Voranol CP1421, a polyether polyol, available from Dow Chemical Co., Midland, Mich.

ORG H: Voranol CP3040, a polyether polyol, available from Dow Chemical Co., Midland, Mich.

ORG I: A competitive, organic demulsifier package, which is currently used to separate the crude oil emulsion that we studied (its composition is unknown).

ORG J: Organic demulsifier #8619 from Baker Petrolite, Sugar Land, Tex., USA

ORG K: Witbreak DRM-9510, an organic demulsifier, available from Akzo Nobel, Netherlands.

ORG L: Kemelix 3575X, an alkoxylated phenolic resin, with 81% actives, available from Croda, East Yorkshire, UK.

ORG M: Kemelix D310, an alkoxylated phenolic resin, with 88% actives, available from Croda, East Yorkshire, UK.

ORG N: Kemelix D317, a modified polyol, available from Croda, East Yorkshire, UK.

DMO46: organic demulsifier package from Baker Petrolite, Sugar Land, Tex., USA

The comparative silicone demulsifiers were:

Silbreak 400, Silbreak 401, Silbreak 402, Silbreak 323, Silbreak 329, Silbreak 603, Silbreak 638, Silbreak 1324 and Silbreak 1840 are modified polydimethylsiloxanes, available from Momentive Performance materials, Wilton, Conn.

Silwet L-8610: a linear siloxane polyethylene oxide copolymer, with 1700 g/mol molecular mass, 100% actives, available from Momentive Performance materials, Wilton, Conn.

SIL A: a lab made epoxy-silicone polyether terpolymer, which was ring-opened with diethanol amine and had the formula $(CH_3)_3SiO(Si(CH_3)_2O)_{300}(Si(R^2)(CH_3)O)_{30}(Si(R^3)(CH_3)O)_{20}Si(CH_3)_3$, where, $R^2$ is a mixture of two polyether copolymers having the average formulas —$CH_2CH_2CH_2(OCH_2CH_2)_{13}(OCH(CH_3)CH_2)_{16}OH$ and —$CH_2CH_2CH_2$—$(OCH_2CH_2)_{33}(OCH(CH_3)CH_2)_{42}OH$ such that the combined average molecular weight is approximately 2200 g/mol; and $R^3$ is an epoxide-containing group of the formula —$(CH_2)_3OCH_2CH(O)CH_2$.

SIL B: a lab made epoxy-silicone polyether terpolymer, which was ring-opened with diethanol amine and had the formula $(CH_3)_3SiO(Si(CH_3)_2O)_{300}(Si(R^2)(CH_3)O)_6(Si(R^3)(CH_3)O)_4Si(CH_3)_3$, where, $R^2$ is a mixture of two polyether copolymers having the average formulas —$CH_2CH_2CH_2(OCH_2CH_2)_{13}(OCH(CH_3)CH_2)_{16}OH$ and —$CH_2CH_2CH_2$—$(OCH_2CH_2)_{33}(OCH(CH_3)CH_2)_{42}OH$ such that the combined average molecular weight is approximately 2200 g/mol; and $R^3$ is an epoxide-containing group of the formula —$(CH_2)_3OCH_2CH(O)CH_2$.

SIL C: a lab made epoxy-silicone polyether terpolymer, which was ring-opened with diethanol amine and had the formula $(CH_3)_3SiO(Si(CH_3)_2O)_{300}(Si(R^2)(CH_3)O)_{15}(Si(R^3)(CH_3)O)_{10}Si(CH_3)_3$, where, $R^2$ is a mixture of two polyether copolymers having the average formulas —$CH_2CH_2CH_2(OCH_2CH_2)_{13}(OCH(CH_3)CH_2)_{16}OH$ and —$CH_2CH_2CH_2$—$(OCH_2CH_2)_{33}(OCH(CH_3)CH_2)_{42}OH$ such that the combined average molecular weight is approximately 2200 g/mol; and $R^3$ is an epoxide-containing group of the formula —$(CH_2)_3OCH_2CH(O)CH_2$.

Demulsification Tests With Crude Oil A:
Test Method:

The following test methods to evaluate the demulsifiers was performed: The standard 100 mL ASTM D4007 conical glass tubes (about 37 mm diameter and 200 mm height from Imeth AG, Germany) were used for the bottle test. One hundred milliliters of crude oil was added to the tube and the diluted demulsifier was added as a 10% solution in xylene. A few demulsifiers were not soluble at this concentration in xylene and were then diluted in 2-methylpropane-1-ol. The injection was done with a micro syringe on top of the crude oil surface.

A rack of 8 conical tubes was used to perform the bottle tests. The rack was shaken by hand for 60 seconds, at 30° angle to horizontal direction (the tubes were shaken downwards, head of tubes being down), followed by 60 seconds pause used for opening the tubes for degassing and again 60 seconds shaking. The volume of the separated water was recorded after a defined time for examples 36-39 with or without centrifugation of big tubes.

The dryness of the oil phase was measured following the ASTM Test Method D4007. After the phase separation process about 6 mL sample was taken from the top of the oil phase and then added to preheated toluene (60° C.) in a graduated, conical centrifuge tube (up to the 50% level). The tubes were then strongly shaken for a few seconds. The following parameters were recorded:

% Free water: the percentage of water separated in the graduated tube after centrifugation (1500 RPM/5 min)

% Total water: the percentage of water found in the graduated tube after adding 1-2 drops of a "knockout dropper" DMO46 (from Baker Petrolite, Sugar Land, Tex., USA), keeping the tube at 60° C. for at least 10 min and centrifugation at 1500 RPM/5 min.

% Interfacial emulsion: % total water minus % free water.

In some of the tests the interface quality (between the separated water phase and the crude oil phase) was also evaluated and graded, "S" meaning Soft interface (by twisting the tube the interface moves easily), "M" meaning Medium quality interface (by twisting the tube the interface moves with difficulty) and "H" for Hard interface (by twisting the tube the interface does not move at all). A "V" was added if the property was enhanced (meaning "Very").

Crude oil A was from the Middle East and it was collected daily at a tank after the gas-oil separator before the demulsifier injection point. (The emulsion was stable and even no free water separated the next day, confirming we have no demulsifier in the crude.)

This crude oil was from offshore, had an API of 28, a water cut of ca. 18%, a low $H_2S$ content and contained few ppm of polydimethylsiloxane (PDMS) as antifoam. The tubes we heated to 60° C. (caps opened) after addition of our silicones. This temperature corresponded to the demulsification condition on the field.

One Component Demulsifiers:

In Table 1 the percentages of water separation were calculated after 15, 30 and 60 minutes, using 100 ppm actives of demulsifiers, at 60° C. From the comparative silicones, Silbreak 1840 showed 33% water separation after 60 min. Silbreak 638 and Silbreak 1324 were exhibiting a very low residual emulsion in the top oil phase, meaning that they could be used in formulation with other demulsifiers. ORG C led to 14% water separation, with a high residual emulsion (% interface) in the top oil phase. Examples 16 and 17 led to 10-11% of water separation after 1 hour with the same type of quality of top oil phase than the ORG C. Example 27 had a different behavior in the sense that it separated only 2% water but the top oil phase had quite a low residual emulsion and high percentage of total water content. Examples 11 and 12 led to the driest oil phase even compared to organics, even if they showed no water separation after 1 hour at 60° C.

TABLE 1

Demulsification results for Crude oil A, at 60° C. and at 100 ppm actives of one component demulsifier.

| | Water separation (%) | | | TOP OIL PHASE | | |
|---|---|---|---|---|---|---|
| Demulsifier | After 15 min | After 30 min | After 1 hr | % Free Water | % Total Water | % Interface |
| Neat Crude Oil A | 0 | 0 | 0 | 0 | 18 | 18 |
| Silbreak 323 | 0 | 0 | 0 | 4 | 12 | 8 |
| Silbreak 329 | 0 | 0 | 2 | 2 | 9.4 | 7.4 |

TABLE 1-continued

Demulsification results for Crude oil A, at 60° C. and at 100 ppm actives of one component demulsifier.

| | Water separation (%) | | | TOP OIL PHASE | | |
|---|---|---|---|---|---|---|
| Demulsifier | After 15 min | After 30 min | After 1 hr | % Free Water | % Total Water | % Interface |
| Silbreak 638 | 0 | 0 | 0 | 13 | 13 | 0 |
| Silbreak 1324 | 0 | 0 | 0 | 8 | 6 | 2 |
| Silbreak 1840 | 17 | 31 | 33 | 2 | 9 | 7 |
| Silwet L-8610 | 0 | 0 | 0 | 11 | 16 | 5 |
| Silbreak 401 | 0 | 1 | 2 | 2 | 14.4 | 12.2 |
| Silbreak 402 | 0 | 0 | 0 | 0 | 3.4 | 3.4 |
| SIL A | 0 | 0 | 0 | 0 | 4.2 | 4.2 |
| SIL B | 0 | 0 | 0 | 0 | 4.2 | 4.2 |
| SIL C | 0 | 0 | 0 | 0 | 2.4 | 2.4 |
| ORG C | 0 | 0 | 14 | 3 | 14 | 11 |
| ORG G | 0 | 0 | 0 | 6 | 18 | 12 |
| ORG H | 0 | 0 | 0 | 12 | 18 | 6 |
| Example 27 | 0 | 0 | 2 | 16 | 18.8 | 2.8 |
| DMO 46 | 0 | 0 | 0 | 3 | 17.7 | 14.7 |
| Example 11 | 0 | 0 | 0 | 0 | 1 | 1 |
| Example 12 | 0 | 0 | 0 | 0 | 1 | 1 |
| Example 14 | 0 | 0 | 0 | 0 | 12 | 12 |
| Example 15 | 0 | 0 | 0 | 0 | 9 | 9 |
| Example 16 | 0 | 0 | 11 | 0 | 13 | 13 |
| Example 17 | 0 | 0 | 10 | 4 | 16 | 12 |
| Example 18 | 0 | 0 | 2 | 6 | 16 | 10 |
| ORG F | 0 | 0 | 0 | 0 | 2.2 | 2.2 |

Demulsifier Blends:

then blends of two silicones were tested and we found that blends containing the new silicone demulsifier structures outperformed the organic demulsifiers and the individual silicones. Tables 2/a and 2/b show the best blends sorted out according to the percentage of water separated after 1 hour and after 24 h (+30 minutes at 60° C.), and according to the dryness of the top oil phase.

An evaluation of interface quality is also given in Table 2/b. All the best candidates gave either a soft interface or a medium quality interface. With 4 binary blends (SIL B/Example 27 (75:25), SIL B/Example 27 (50:50), SIL C/Example 27 (50:50), Example 12/Example 27 (50:50)) of silicones at a 100 ppm treat rate we could reach 83% of water separation after only 1 hour (compared to 33% with only one silicone). Four-six hours later, at room temperature, the blends Example 12/Example 27 and Example 11/Example 27 (50:50) at 100 ppm led to up to 98% water separation. The blend of Silbreak 402 and Example 27 (50:50) and 100 ppm led to 83% water separation. All these blends performed better in water separation than ORG F/Example 27 (50:50), 100 ppm and led to atop oil phase containing less than 2% water. A reduction of the treat rate to 50 ppm did not decrease too much the demulsification efficiency of some of these blends.

TABLE 2/a

Demulsification tests with Crude oil A, at 60° C. and at 50 to 100 ppm actives of demulsifier blends.
Best performing systems, based on rate of water separation

| Best demulsifiers | ppm demulsifier | % Separated water after 1 h at 60° C. | Best demulsifiers | ppm demulsifier | % Separated water after 1 h at 60° C. + 4-6 h at 24° C. |
|---|---|---|---|---|---|
| SIL B/Example 27 (75:25) | 100 | 83 | Example 12/Example 27 (50:50) | 100 | 98 |
| SIL B/Example 27 (50:50) | 100 | 83 | Example 11/Example 27 (50:50) | 100 | 94 |
| SIL C/Example 27 (50:50) | 100 | 83 | SIL B/Example 27 (75:25) | 100 | 89 |
| Example 12/Example 27 (50:50) | 100 | 83 | SIL C/Example 27 (50:50) | 100 | 89 |
| Silbreak 402/Example 27 (50:50) | 100 | 78 | SIL B/Example 27 (50:50) | 100 | 86 |
| SIL B/Example 27 (25:75) | 100 | 72 | Silbreak 402/Example 27 (50:50) | 100 | 83 |
| Example 11/Example 27 (50:50) | 100 | 72 | SIL B/Example 27 (25:75) | 100 | 78 |
| SIL B/Example 27 (50:50) | 50 | 67 | SIL B/Example 27 (50:50) | 50 | 67 |
|  |  |  | SIL B/Example 27 (25:75) | 50 | 64 |

TABLE 2/b

Demulsification tests with Crude oil A, at 60° C. and at 50 to 100 ppm actives of demulsifier blends.
Best performing systems, based on water separation overnight and total residual water content in top oil phase

| Best demulsifiers | ppm demulsifier | % Separated Water after overnight at 24° C. + 30 min at 60° C. | Interface Quality | Water quality | Best demulsifiers | ppm demulsifier | % Total Water in top oil phase |
|---|---|---|---|---|---|---|---|
| Example 12/Example 27 (50:50) | 100 | 98 | S | Medium | Example 11 | 100 | 1 |
| Example 11/Example 27 (50:50) | 100 | 97 | S | Medium | Example 12 | 100 | 1 |
| SIL C/Example 27 (50:50) | 100 | 94 | S | Medium | Example 11/Example 27 (50:50) | 100 | 1.4 |
| SIL B/Example 27 (75:25) | 100 | 92 | S | Clear | SIL B/Example 27 (75:25) | 100 | 1.8 |
| SIL B/Example 27 (50:50) | 100 | 89 | S | Clear | Example 12/Example 27 (50:50) | 100 | 2 |
| SIL B/Example 27 (25:75) | 100 | 87 | S | Clear |  |  |  |
| Silbreak 402/Example 27 (50:50) | 100 | 86 | S | Medium |  |  |  |
| SIL B/Example 27 (50:50) | 50 | 72 | S | Medium |  |  |  |
| ORG F/Example 27 (50:50) | 100 | 72 | S | Medium |  |  |  |

The best blends in water separation and top oil dryness were blends SIL B/Example 27 (75:25), Example 12/Example 27 (50:50) and Example 11/Example 27 (50:50). They were much better than the single components of the blend (synergy) and better than a blend of an organic and a silicone like ORG F/EXAMPLE 27 (50:50) at 100 ppm.

Demulsification of Crude Oil B:

One Component Demulsifiers:

Crude oil B was also from the Middle East. It had a higher sulfur content, API 33° and a water cut of 10%. We tested the best pure silicones and the best blends found for crude oil A. The demulsification in bottle tests were also done at 60° C. The results can be found in Table 3 using 100 ppm demulsifiers.

TABLE 3

Demulsification of Crude oil B at 60° C. and 100 ppm actives of one component demulsifiers

| Demulsifier | % Water separation | | | TOP OIL PHASE | | |
|---|---|---|---|---|---|---|
|  | After 15 min | After 30 min | After 1 hr | % Free Water | % Total Water | % Interface calculated |
| Neat Crude Oil B | 0 | 0 | 0 | 0 | 10 | 10 |
| Silwet L-8610 | 0 | 5 | 28 | 3.6 | 4.2 | 0.6 |
| Silbreak 402 | 0 | 25 | 30 | 0.2 | 1.2 | 1 |
| SIL B | 0 | 0 | 2 | 0 | 0.4 | 0.4 |
| SIL C | 70 | 75 | 80 | 0.4 | 1.4 | 1 |
| ORG C | 0 | 0 | 0 | 1 | 1 | 1 |

TABLE 3-continued

Demulsification of Crude oil B at 60° C. and 100 ppm actives of one component demulsifiers

| Demulsifier | % Water separation | | | TOP OIL PHASE | | |
|---|---|---|---|---|---|---|
| | After 15 min | After 30 min | After 1 hr | % Free Water | % Total Water | % Interface calculated |
| Example 27 | 0 | 28 | 90 | 0.6 | 0.8 | 0.2 |
| Example 11 | 0 | 0 | 0 | 0 | 4.8 | 4.8 |
| Example 14 | 0 | 0 | 0 | 0 | 2.4 | 2.4 |
| Example 16 | 35 | 55 | 70 | 0 | 0.8 | 0.8 |
| Example 17 | 70 | 72 | 80 | 0 | 1.4 | 1.4 |
| ORG F | 0 | 0 | 0 | 0 | 2.2 | 2.2 |
| ORG A | 15 | 35 | 45 | 4 | 4.4 | 0.4 |
| Silbreak 323 | 60 | 70 | 70 | 2.2 | 2.4 | 0.2 |
| Silbreak 603 | 0 | 70 | 75 | 1 | 1.2 | 0.2 |
| Silbreak 1840 | 70 | 75 | 80 | 0.4 | 1.6 | 1.2 |

For Crude oil B silicones on their own showed better water separation than in Crude oil A. Silbreak 1840 and Silbreak 603 were efficient silicone demulsifiers with a percentage of water of separation after 1 hour up to 80%. Silbreak 1840 had a quick speed of separation in this oil. Both are giving a quite dry top oil phase with 1.2 and 1.6% of total water. Example 27 was giving the best (but slowest) separation results reaching 90% of water separation. Example 17 and Example 14 were good candidates as they allowed 80% of water separation after 1 hour.

Demulsifier Blends:

Table 4 shows the results obtained for the best blends used with crude oil A and also some new blends tested for the Crude oil B only.

TABLE 4

Demulsification of crude oil B, at 60° C., with demulsifier blends.

| Demulsifier blend | Demulsifier actives (ppm) | % Water separation | | | TOP OIL PHASE | | |
|---|---|---|---|---|---|---|---|
| | | After 15 min | After 30 min | After 1 hr | % Free Water | % Total Water | % Interface |
| Neat Crude Oil B | 0 | 0 | 0 | 0 | 0 | 10 | 10 |
| SIL B/Example 27 (75:25) | 100 | 100 | 100 | 100 | 0 | 0 | 0 |
| Silbreak 402/Example 27 (50:50) | 100 | 72 | 80 | 82 | 1.2 | 1.6 | 0.4 |
| Example 11/Example 27 (50:50) | 100 | 98 | 100 | 100 | 0.4 | 0.4 | 0 |
| ORG F/Example 27 (50:50) | 100 | 90 | 93 | 95 | 0.2 | 0.4 | 0.2 |
| ORG F/Silwet L-8610 (50:50) | 100 | 0 | 0 | 70 | 0 | 0.2 | 0.2 |
| Silbreak 1840/ORG A (75:25) | 100 | 45 | 55 | 70 | 0.4 | 1 | 0.6 |
| Silbreak 603/ORG A (75:25) | 100 | Nd | 60 | 70 | 2 | 2 | 2 |
| SIL B/ORG A (75:25) | 100 | Nd | 80 | 80 | 0.2 | 0.2 | 0 |
| SIL B/Example 18 (50:50) | 100 | Nd | 90 | 90 | 0 | 0 | 0 |
| SIL B/Example 27 (50:50) | 100 | Nd | 85 | 88 | 0 | 0 | 0 |
| SIL B/Example 27 (25:75) | 100 | Nd | 82 | 85 | 0 | 0.2 | 0.2 |
| ORG A/ORG F (75:25) | 100 | 60 | 70 | 70 | 0.4 | 0.8 | 0.4 |
| SIL B/Example 27 (75:25) | 50 | 75 | 82 | 85 | 0 | 0.2 | 0.2 |
| SIL B/Example 27 (50:50) | 50 | 80 | 82 | 82 | 0 | 0.4 | 0.4 |

Nd: not determined

Two blends SIL B/Example 27 (75:25), Example 11/Example 27 (50:50), resulted in a 100% water separation, very quickly (15-30 min) and a dry top oil phase, which was a big improvement compared to the single component demulsifiers. Other good blends were SIL B/Example 18 (50:50) and SIL B/Example 27 (50:50). A decrease of the treat rate of some good blends decreased only slightly the performance of the blends.

Demulsification Tests with Crude Oil C:

Crude oil C was also from the Middle East, from off shore wells. It had an API of 29° and a water cut of 10%. The $H_2S$ content of this crude was low. Live crude oil C was collected daily before the gas-oil separator. The crude oil from the pipe was collected in cans and was let to degas. Temperature of the collected crude is around 37° C. In the lab, temperature of crude goes down and the bottle tests were run between 27 and 29° C. The results are shown in Table 5. In this Table the percentages of separation were calculated after 30 min, after 30 min+centrifugation, and after 30 min+centrifirgation+little shake to simulate the demulsification process.

After centrifugation (simulating the shear in the demulsification tank) the rate of separation increased due to the presence of demulsifier. The centrifugation of neat crude oil led to zero water separation indicating that centrifugation alone does not cause separation, without the action of demulsifier. The interface quality (between the separated water phase and the crude oil phase) is also given in Table 5.

various blends sorted out according to the percentage of water separated after "30 min+centrifugation" and "after 24 h (+30 minutes at 60° C.), and according to the dryness of the top oil phase for crude oil C.

Table 6 contains the results for some of the best demulsifiers. The blend of Example 11 and Example 27 shows best demulsification results at 50:50 ratio and 100 ppm actives,

TABLE 5

Demulsification results for Crude oil C, API = 29° Water cut 10% at 27-29° C. with one component demulsifier

| | | | Water separation (%) | | | TOP OIL PHASE | | |
| --- | --- | --- | --- | --- | --- | --- | --- | --- |
| Interface Quality | Demulsifier | Demulsifier actives (ppm) | after 30 min | after 30 min + centrif. | after 30 min + centrif. + little shake | % Free Water | % Total Water | % interfacial emulsion |
| nd | Neat Crude Oil C | 0 | 0 | 0 | 0 | 0 | 1.6 | 1.6 |
| M | Silbreak 323 | 100 | 0 | 40 | 45 | 0 | 1.6 | 1.6 |
| S | Silbreak 1840 | 100 | 0 | 52 | 55 | 0 | 1.4 | 1.4 |
| S | Silwet L-8610 | 100 | 0 | 3 | 12 | 0.8 | 1.6 | 0.8 |
| S | Example 27 | 100 | 0 | 7 | 15 | 0 | 2.2 | 2.2 |
| nd | Example 11 | 100 | 0 | 0 | 0 | 0 | 1.6 | 1.6 |
| nd | Example 15 | 100 | 0 | 0 | 0 | 0 | 1.8 | 1.8 |
| S | Example 17 | 100 | 0 | 22 | 25 | 0 | 1.0 | 1.0 |
| nd | Example 18 | 100 | 0 | 0 | 0 | 0 | 2.4 | 2.4 |
| nd | ORG A | 100 | 0 | 3 | 3 | 0.4 | 2.0 | 1.6 | nd: not determined

Table 5 shows that Example 17 led to a better water separation (25%) and a better dryness of the oil (with 1% total water in the top of the oil phase) than ORG A. It showed also a better oil dryness than Silbreak 323 and Silbreak 1840, silicone demulsifiers.

Blends of Demulsifiers:

blends of silicone demulsifiers were also tested to improve the water separation rate and dryness of the oil. Table 6 shows corresponding to a synergy between the two silicones compared to the single components. At 50 ppm it still shows good demulsifying properties, better than for the best organic ORG A at 100 ppm actives (see Table 5).

The blend of Example 27 and SIL B shows also good demulsifying performances compared to the single components, a synergy between a new and a comparative silicone demulsifier.

TABLE 6

Demulsification tests with the best silicone demulsifiers blends, using Crude oil C, at 27-29° C.

| | | Level of actives (ppm) | Water separation (%) | | | TOP OIL PHASE | | |
| --- | --- | --- | --- | --- | --- | --- | --- | --- |
| Interface Quality | Demulsifier | | After 30 min | After 30 min + Centrif. | After 30 min + Centrif. + little shake | % Free Water | % Total Water | % Interfacial emulsion |
| Nd | Neat Crude Oil C | Pure Xylene | 0 | 0 | 0 | 0 | 1.6 | 1.6 |
| S | Example 11/Example 27 (50:50) | 100 | 35 | 98 | 100 | 0 | 0.0 | 0.0 |
| S | Example 11/Example 27 (50:50) | 75 | 21 | 88 | 91 | 0 | 0.2 | 0.2 |
| S | SIL B/Example 27 (50:50) | 100 | 0 | 90 | 90 | 0 | 0.4 | 0.4 |
| VS | SIL B/Example27 (25:75) | 100 | 0 | 67 | 80 | 0 | 0.4 | 0.4 |
| S | SIL B/Example 27 (50:50) | 75 | 0 | 80 | 80 | 0 | 1.0 | 1.0 |
| S | SIL B/Example 27 (75:25) | 100 | 0 | 60 | 78 | 0 | 0.2 | 0.2 |
| H | Example 11/Example 27 (50:50) | 50 | 0 | 60 | 77 | 0 | 1.2 | 1.2 |

Demulsification Tests with Crude Oil D:

Crude oil D came from the middle east, from off-shore wells and had an API of 25° and a water cut of ca. 18%. Water separation was recorded at 27-29° C. for 30 min and afterwards centrifugation of the 100 mL tubes was performed. The centrifugation of neat crude oil led to zero water separation indicating that centrifugation alone does not cause separation without the action of demulsifier.

Silicones were first tested individually to see their performance in this crude oil. The results with 100 ppm individual, silicone and organic demulsifiers are shown in Table 7.

Example 17 led to 74% water separation with a dryer oil than Silbreak 1840 or Silbreak 323 comparative silicones. Some reproducibility problems occurred with this product too from one day to the next. On the same day Example 17 led to more water separation with a drier oil other than the best organic, ORG D (37% water separation and 3.8% total water in the top oil phase). With Example 17 the dryness of the top oil is less than with ORG B, which led to the driest top oil phase (close to Silbreak 1840) nevertheless with no visible water separation in the tube.

Blends of Demulsifiers:

Blends of various silicones were also tested to improve the demulsifying performance with crude oil D. Table 8 shows that maximum 80% water separation was reached with blends of two silicones for crude oil D and dryer oil than with one silicone only (see Table 7). Some synergy can be shown between two silicones or with one silicone and one organic demulsifier. The best blends in water separation were Example 11/Example 27 (50:50) and ORG F/Example 27 (50:50) which both showed better demulsification results than the individual components alone. Blends of Example 11/Example 27 (50:50) and SIL B/ORG E (75:25) provided the driest top oil phase, which were much dryer than with the individual components.

The blend Example 11/Example 27 (50:50) at 100 ppm actives was the best demulsifying blend for both crude oil C (see Example 38) and crude oil D at 27-29° C. and after centrifugation.

TABLE 7

Demulsification results with Crude oil D, at 27-29° C. and 100 ppm treat rate with one component demulsifier.

| | | Water separated (%) | | | TOP OIL PHASE | | |
|---|---|---|---|---|---|---|---|
| Interface Quality | Demulsifier | After 30 min | After 30 min + Centrif. | After 30 min + Centrif. + little shake | % Free Water | % Total Water | % Interfacial emulsion |
| nd | Neat Crude Oil D | 0 | 1 | 1 | 0 | 6.0 | 6.0 |
| M | Silbreak 1840 | 0 | 40 | 46 | 0 | 0.8 | 0.8 |
| M | Silbreak 323 | 0 | 20 | 46 | 0 | 5.2 | 5.2 |
| nd | Silbreak 603 | 0 | 1 | 2 | 0 | 5.2 | 5.2 |
| nd | Silwet L-8610 | 0 | 3 | 3 | 0.8 | 4.4 | 3.6 |
| nd | Silbreak 402 | 0 | 0 | 0 | 0 | 3.0 | 3.0 |
| nd | ORG B | 0 | 0 | 0 | 0 | 0.6 | 0.6 |
| nd | SIL B | 0 | 1 | 1 | 0 | 1.9 | 1.9 |
| nd | SIL B | 0 | 1 | 2 | 0 | 3.6 | 3.6 |
| H | SIL C | 0 | 10 | 10 | 0 | 2.0 | 2.0 |
| nd | ORG C | 0 | 1 | 1 | 0 | 4.4 | 4.4 |
| nd | Example 27 | 0 | 10 | 10 | 0.2 | 4.0 | 3.8 |
| nd | Example 11 | 0 | 0 | 0 | 0 | 2.4 | 2.4 |
| nd | Example 15 | 0 | 1 | 1 | 0 | 5.2 | 5.2 |
| S | Example 17 | 0 | 51 | 74 | 0 | 4.4 | 4.4 |
| M | Example 17 | 0 | 17 | 26 | 0 | 9.0 | 9.0 |
| H | Example 18 | 0 | 17 | 17 | 0 | 5.1 | 5.1 |
| S | ORG D | 0 | 35 | 37 | 0 | 3.8 | 3.8 |
| nd | ORG E | 0 | 3 | 3 | 0 | 2.8 | 2.8 |
| nd | ORG F | 0 | 1 | 1 | 0 | 1.1 | 1.1 |
| nd | ORG A | 0 | 2 | 2 | 0 | 3.2 | 3.2 |

TABLE 8

Demulsification tests with Crude oil D at 27-29° C. with demulsifier blends.

| | | | Water separated (%) | | | TOP OIL PHASE | | |
|---|---|---|---|---|---|---|---|---|
| Interface Quality | Demulsifier | Level of actives (ppm) | After 30 min | After 30 min + Centrif. | After 30 min + Centrif. + little shake | % Free Water | % Total Water with | % Interfacial emulsion |
| nd | Neat Crude Oil D | Pure xylene | 0 | 1 | 0 | 0 | 6.0 | 6.0 |
| S | Example 11/Example 27 (50:50) 100 ppm | 100 | 0 | 80 | 80 | 0 | 1.2 | 1.2 |

TABLE 8-continued

Demulsification tests with Crude oil D at 27-29° C. with demulsifier blends.

|  |  |  | Water separated (%) |  |  | TOP OIL PHASE | | |
|---|---|---|---|---|---|---|---|---|
|  |  | Level | | | After 30 min + | | | |
| Interface Quality | Demulsifier | of actives (ppm) | After 30 min | After 30 min + Centrif. | Centrif. + little shake | % Free Water | % Total Water with | % Interfacial emulsion |
| S | Example 11/Example 27 (50:50) 100 ppm | 100 | 1 | 71 | 77 | 0 | 0.6 | 0.6 |
| VS | Example 11/Example 27 (50:50) 100 ppm | 100 | 0 | 63 | 69 | 0 | 0.8 | 0.8 |
| VS | Example 11/Example 27 (50:50) 200 ppm | 200 | 0 | 74 | 80 | 0 | 0.1 | 0.1 |
| S | ORG F/Example 27 (50:50) 100 ppm | 100 | 0 | 63 | 74 | 0.4 | 1.6 | 1.2 |
| nd | SIL B/ORG E (75:25) | 100 | 0 | 0 | 0 | 0 | 0.6 | 0.6 |

Demulsification Efficiency Tests with Crude Oil E:

The phase separation of a sample of Crude Oil E, a heavy crude oil (API: 10) containing about 36 wt. % emulsified water, from Alberta, Canada was studied. The total acid number of the samples was about 1.5 mg KOH/g, the asphaltene content was about 4%, the filterable solids content was 660 lb/1000 bbl and the salt content was 1180 lb/1000 bbl.

Test Procedure with Crude Oil E:

The crude sample was homogenized by first heating it to about 60° C. and then thoroughly shaking the container by hand for several minutes. One hundred grams of crude oil emulsion was carefully poured into prescription glass bottles, which had marks at 10 ml intervals ("San-Glas Ovals-Flint", made by Owen-Brockway, Ill., USA) and threaded cap. The silicone demulsifiers were diluted to 30% with xylene. First, the bottles with the crude oil sample were heated for 5 min in an oil bath, which was at 85° C. Then the bottles were flipped twice, followed by shaking them with a Bamstead/Labline Max 2000 orbital shaker for 10 min, at 270 shakes/min rate and then placing the bottles back to the bath at 85° C. After 1 hour heating the bottles were shaken again with the orbital shaker for another 10 minutes and then placed back to the bath at 85° C. After 30 minutes the bottles were flipped ten times sideways with a rocking motion. After one hour the bottles were gently flipped, horizontally, twenty times to break up the "eggs" at the interface. After about 20-22 hours, the jars were taken out of the oil bath and the quality of the water/crude oil interface was inspected and the volume in percent (%) of the separated water phase was measured. The water content of the separated crude oil was measured with two methods: 1.) a small sample (0.05-0.5 ml) was taken from the middle of the crude oil phase. The water content of this small sample was measured with Karl-Fischer titration using a Brinkman Titrino Workcell with "751 GDP" titrator and Hydranal Composite-2 titrator solution; 2.) about 15 ml sample was extracted from the bottom of the oil phase with a syringe and then poured into 12.5 ml Kimble conical-bottom glass centrifuge tubes up to the 50% mark and then diluted up to 100% with toluene. The diluted samples were centrifuged for five minutes at 2500 rpm with an IEC HN-SII centrifuge. The amount of separated water was recorded ("Free water"). The amount of total water was measured by adding 1-2 drops of knockout dropper (DMO46 from Baker Petrolite) and mixing the emulsion and heating it up in a water bath followed by centrifugation as above. The "emulsion" content of the crude was calculated by subtracting the "free water" content from the total water content.

Table 9 illustrates that competitive demulsification performance could be achieved with the new silicone compositions. For example, combinations of Organic M, Silbreak 400 and Example 10 or Example 11 outperform all the organic demulsifiers tested (last six tests).

TABLE 9

Results of demulsification tests with Crude Oil H, at 85° C.

| | | | | % water | K. Fisher, | Centrifuge test, after 20-22 h | | |
|---|---|---|---|---|---|---|---|---|
| # | Demulsifier | ppm as is | ppm (actives) | separated and Interface | after 20-22 h % water | % Free water | % Total water | % Emulsion |
| 1 | Blank | 0 | 0 | 6 | 25.85 | 6 | 34 | 28 |
| 2 | ORG I | 300 | 150 | 37.1 | 1.55 | 0.51 | 1.44 | 0.93 |
| 3 | ORG J | 400 | 120 | 38 B* | 1.77 | 0.60 | 1.70 | 1.10 |
| 4 | Example 11 | 400 | 120 | 36 B | 2.72 | 1.9 | 1.6 | −0.3 |
| 5 | Example 12 | 400 | 120 | 36 B | 2.54 | 0.6 | 1.6 | 1 |
| 6 | Example 17 | 400 | 120 | 36 B | 2.64 | 1.8 | 2 | 0.2 |
| 7 | Example 18 | 400 | 120 | 26 B | 19.35 | 6 | 16 | 10 |
| 8 | Example 29 | 400 | 120 | 29 B | 8.30 | 2.8 | 4.4 | 1.6 |
| 9 | Example 30 | 400 | 120 | 19 B | 20.53 | 6 | 18 | 12 |
| 10 | Example 14 | 400 | 120 | 25 | 16.89 | 0.2 | 12 | 11.6 |
| 11 | 8619 + Example 17; 1:2 blend | 133 + 267 | 40 + 80 | 30 | 13.50 | 3.2 | 13 | 9.8 |
| 12 | 8619 + Example 22, 1:1 | 200 + 200 | 60 + 60 | 28 B | 9.13 | 3.6 | 12 | 8.4 |
| 13 | ORG J + Example 10, 1:1 | 200 + 200 | 60 + 60 | 37 B | 0.80 | 0.6 | 0.8 | 0.2 |
| 14 | ORG J + Example 10, 1:1 | 200 + 200 | 60 + 60 | 39 BB | 4.08 | 0.8 | 5.2 | 4.4 |

TABLE 9-continued

Results of demulsification tests with Crude Oil H, at 85° C.

| # | Demulsifier | ppm as is | ppm (actives) | % water separated and Interface | K. Fisher, after 20-22 h % water | Centrifuge test, after 20-22 h % Free water | % Total water | % Emulsion |
|---|---|---|---|---|---|---|---|---|
| 15 | ORG J + Example 10, 1:1 | 200 + 200 | 60 + 60 | 32 B | 8.21 | 1.2 | 8 | 6.8 |
| 16 | ORG J + Example 10, 1:1 | 200 + 200 | 40 + 80 | 34 B | 8.75 | 1.6 | 10 | 8.4 |
| 17 | ORG J + Example 10, 1:2 | 133 + 267 | 40 + 80 | 34 BB | 2.67 | 1.2 | 3.2 | 2 |
| 18 | ORG J + Example 10, 1:2 | 133 + 267 | 40 + 80 | 32 B | 5.10 | 0.6 | 4.5 | 3.9 |
| 19 | ORG J + Example 10, 1:2 | 267 + 133 | 80 + 40 | 39 BB | 2.35 | 0.8 | 2.8 | 2 |
| 20 | ORG J + Example 11; 1:1 | 200 + 200 | 60 + 60 | 39 B | 0.77 | 0.4 | 0.9 | 0.5 |
| 21 | ORG J + Example 11; 1:1 | 200 + 200 | 60 + 60 | 33 B | 3.96 | 0.8 | 2 | 1.2 |
| 22 | ORG J + Example 11; 1:2 | 133 + 267 | 40 + 80 | 33 B | 7.39 | 0.8 | 3.8 | 3 |
| 23 | ORG J + Example 11; 2:1 | 267 + 133 | 80 + 40 | 33 B | 2.77 | 1.6 | 3 | 1.4 |
| 24 | ORG J + Example 12; 1:1 | 200 + 200 | 60 + 60 | 35 B | 2.77 | 0.8 | 2.4 | 1.6 |
| 25 | ORG J + Example 12; 1:1 | 200 + 200 | 60 + 60 | 38 B | 5.02 | 1.2 | 4.8 | 3.6 |
| 26 | ORG J + Example 12; 1:2 | 133 + 267 | 40 + 80 | 35 B | 3.25 | 0.2 | 1.4 | 1.2 |
| 27 | ORG J + Example 12; 1:2 | 133 + 267 | 40 + 80 | 34 B | 1.81 | 0.4 | 2 | 1.6 |
| 28 | ORG J + Example 12; 2:1 | 267 + 133 | 80 + 40 | 38 BB | 2.45 | 0.8 | 3.4 | 2.6 |
| 29 | ORG J + Example 12; 1:1 | 200 + 200 | 40 + 80 | 32 | 11.25 | 2.4 | 12 | 9.6 |
| 30 | ORG J + Example 22; 1:1 | 200 + 200 | 60 + 60 | 33 B | 2.40 | 1.6 | 2.8 | 1.2 |
| 31 | ORG J + Example 23; 1:1 | 200 + 200 | 60 + 60 | 38 | 0.93 | 0.8 | 1.2 | 0.4 |
| 32 | ORG J + Example 23; 1:1 | 200 + 200 | 60 + 60 | 35 B | 5.54 | 1.6 | 8 | 6.4 |
| 33 | ORG J + Example 23; 1:2 | 133 + 267 | 40 + 80 | 34 B | 3.91 | 2.8 | 5 | 2.2 |
| 34 | ORG J + Example 23; 2:1 | 267 + 133 | 80 + 40 | 37 | 5.93 | 2 | 3.8 | 1.8 |
| 35 | ORG J + Example 24; 1:1 | 200 + 200 | 60 + 60 | 36 | 1.06 | 1.2 | 1.6 | 0.4 |
| 36 | ORG K | 400 | 120 | 38 | 2.09 | 0.6 | 2 | 1.4 |
| 37 | ORG K + Example 12; 1:1 | 200 + 200 | 60 + 60 | 37 | 2.06 | 1.6 | 2 | 0.4 |
| 38 | ORG K + Example 12; 1:1 | 200 + 200 | 60 + 60 | 38 | 4.93 | 1.2 | 4.4 | 3.2 |
| 39 | ORG L | 400 | 120 | 36B | 2.13 | 0.5 | 2.3 | 1.8 |
| 40 | ORG L + Example 12; 1:1 | 200 + 200 | 60 + 60 | 37 | 5.06 | 1.8 | 4.9 | 3.1 |
| 41 | ORG L + Example 12; 1:1 | 200 + 200 | 60 + 60 | 39 | 3.02 | 0.4 | 3 | 2.6 |
| 42 | ORG M | 400 | 120 | 37 B | 2.06 | 1.5 | 2.4 | 0.9 |
| 43 | ORG M + Example 12; 1:1 | 200 + 200 | 60 + 60 | 38 | 2.21 | 2 | 2 | 0 |
| 44 | ORG M + Example 12; 1:1 | 200 + 200 | 60 + 60 | 37 | 3.15 | 3.2 | 3.8 | 0.6 |
| 45 | ORG N | 400 | 120 | 37 B | 2.12 | 0.33 | 1.3 | 0.97 |
| 46 | ORG N + Example 12; 1:1 | 200 + 200 | 60 + 60 | 34 | 4.10 | 0.8 | 3.8 | 3 |
| 47 | ORG N + Example 12; 1:1 | 200 + 200 | 60 + 60 | 38 | 3.09 | 0.8 | 2 | 1.2 |
| 48 | Silbreak 400 | 400 | 120 | 34 | 6.98 | 3.33 | 6.80 | 3.47 |
| 49 | ORG M + Silbreak 400 + Example 11, 1:1:1 | 133 + 133 + 133 | 40 + 40 + 40 | 38 | 1.13 | 0.8 | 0.8 | 0 |
| 50 | ORG M + Silbreak 400 + Example 11, 1:1:1 | 133 + 133 + 133 | 40 + 40 + 40 | 38 | 0.91 | 0.4 | 0.8 | 0.4 |
| 51 | ORG M + Silbreak 400 + Example 10, 1:1:1 | 133 + 133 + 133 | 40 + 40 + 40 | 40 | 0.66 | 0.4 | 0.6 | 0.2 |
| 52 | ORG M + Silbreak 400 + Example 11, 1:1:1 | 100 + 100 + 100 | 30 + 30 + 30 | 33 | 3.07 | 0.8 | 3 | 2.2 |
| 53 | ORG M + Silbreak 400 + Example 11, 1:1:1 | 100 + 100 + 100 | 30 + 30 + 30 | 38 B | 2.33 | 0.8 | 1.6 | 0.8 |
| 54 | ORG M + Silbreak 400 + Example 10, 1:1:1 | 100 + 100 + 100 | 30 + 30 + 30 | 39 | 0.69 | 0 | 0 | 0 |

*B: baggy interface;
BB: very baggy interface

While the invention has been described with reference to a preferred embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

What is claimed is:

1. A method for separating emulsions of oil and water, the method comprising incorporating a demulsifying-effective amount of at least one polyorganosiloxane demulsifier into an emulsion comprising an oil phase and an aqueous phase, the polyorganosiloxane demulsifier having a molecular structure comprising a polysiloxane backbone of at least two siloxane units covalently bound to (i) one or more pendant alkylene oxide groups comprising one or more alkylene oxide units independently having 1 to 6 carbon atoms, and (ii) one or more pendant groups having the formula $(C_rH_{2r})B$ wherein r equals 0 to 30 and B is an aryl radical; and (iii) one or more pendant alkyl groups having at least 4 and up to 40 carbon atoms.

2. The method of claim 1, wherein the polyorganosiloxane has the formula:

wherein:
$M^1 = R^1R^2R^3SiO_{1/2}$
$M^2 = R^4R^5R^6SiO_{1/2}$
$M^3 = R^7R^8R^9SiO_{1/2}$
$M^4 = R^{10}R^{11}R^{12}SiO_{2/2}$
$D^1 = R^{13}R^{14}SiO_{2/2}$
$D^2 = R^{15}R^{16}SiO_{2/2}$
$D^3 = R^{17}R^{18}SiO_{2/2}$
$D^4 = R^{19}R^{20}SiO_{2/2}$ $T^1 = R^{21}SiO_{3/2}$ $T^2 = R^{22}SiO_{3/2}$ $T^3 = R^{23}SiO_{3/2}$ $T^4 = R^{24}SiO_{3/2}$ $Q = SiO_{4/2}$ and, $R^1$ is an alkyl group having from 1 to 12 carbon atoms, an OH or $OR^{25}$; $R^2$, $R^3$, $R^5$, $R^6$, $R^8$, $R^9$, $R^{13}$, $R^{14}$, $R^{18}$, $R^{21}$ are alkyl groups having from 1 to 12 carbon atoms; $R^4$, $R^{15}$, $R^{22}$ are $(C_nH_{2n})-O-(C_2H_4O)_o-(C_3H_6O)_p-(C_4H_8O)_q-R^{26}$, n equals 0 to 6, o equals 0 to 100, p equals 0 to 100 and q equals 0 to 50, provided $o+p+q \geq 1$; $R^7$, $R^{17}$, $R^{23}$ are branched, linear or cyclic, saturated or unsaturated alkyl groups having from 4 to 36 carbon atoms; $R^{10}$, $R^{19}$, $R^{24}$ are aryl groups having the general formula $(C_rH_{2r})B$ wherein r equals 0-30 and B is an aryl radical; $R^{11}$, $R^{12}$, $R^{20}$ are aryl groups having the general formula $(C_rH_{2r})B$, wherein r equals 0 to 30 or an alkyl group having from 1 to 12 carbon atoms; $R^{25}$ is an alkyl group with 1 to 12 carbon atoms and $R^{26}$ is a hydrogen or an alkyl groups having from 1 to 12 carbon atoms, wherein the subscripts a, b, c, d, e, f, g, h, i, j, k, l, m are zero or positive integers for molecules subject to the following limitations: $3 \leq a+b+c+d+e+f+g+h+i+j+k+l+m \leq 500$, $b+f+j \geq 1$, $c+g+k>0$, $d+h+l \geq 1$, and $(a+b+c+d)$ equals $2+i+j+k+l+2m$.

3. The method of claim 2, wherein $R^1$ is $CH_3$, OH or $OCH_3$; $R^2$, $R^3$, $R^5$, $R^6$, $R^8$, $R^9$, $R^{13}$, $R^{14}$, $R^{16}$, $R^{18}$, $R^{21}$ are $CH_3$, $R^{20}$ is an aryl having the formula $(C_rH_{2r})B$ and $R^{11}$, $R^{12}$ are either $CH_3$ or an aryl having the formula $(C_rH_{2r})B$, with the proviso if the polysiloxane contains diphenyl $R^{19}$ and $R^{20}$ are $C_6H_5$.

4. The method of claim 2, wherein $R^1$ is $CH_3$, OH or $OCH_3$; $R^2$, $R^3$, $R^5$, $R^6$, $R^8$, $R^9$, $R^{13}$, $R^{14}$, $R^{16}$, $R^{18}$, $R^{21}$ are $CH_3$, and $R^{11}$, $R^{12}$, $R^{20}$ are $CH_3$.

5. The method of claim 1, wherein the polyorganosiloxane has the formula:

$$M^1_a M^2_b M^3_c M^4_d D^1_e D^2_f D^3_g D^4_h$$

wherein:

$M^1 = R^1R^2R^3SiO_{1/2}$ $M^2 = R^4R^5R^6SiO_{1/2}$ $M^3 = R^7R^8R^9SiO_{1/2}$ $M^4 = R^{10}R^{11}R^{12}SiO_{2/2}$ $D^1 = R^{13}R^{14}SiO_{2/2}$ $D^2 = R^{15}R^{16}SiO_{2/2}$ $D^3 = R^{17}R^{18}SiO_{2/2}$ $D^4 = R^{19}R^{20}SiO_{2/2}$ and, $R^1$ is an alkyl group having from 1 to 12 carbon atoms, an OH or $OR^{25}$; $R^2$, $R^3$, $R^5$, $R^6$, $R^8$, $R^9$, $R^{13}$, $R^{14}$, $R^{16}$, $R^{18}$ are alkyl groups having from 1 to 12 carbon atoms; $R^4$, and $R^{15}$, are $(C_nH_{2n})-O-(C_2H_4O)_o-(C_3H_6O)_p-(C_4H_8O)_q-R^{26}$; n equals 0 to 6, o equals 0 to 100, p equals 0 to 100 and q equals 0 to 50, provided $o+p+q \geq 1$; $R^7$ and $R^{17}$ are linear, branched or cyclic, saturated or unsaturated alkyl groups having from 4 to 36 carbon atoms; $R^{10}$ and $R^{19}$ are aryl groups having the general formula $(C_rH_{2r})B$ wherein r equals 0-30 and B is an aryl radical; $R^{11}$, $R^{12}$, $R^{20}$ are aryl groups having the general formula $(C_rH_{2r})B$, wherein r equals 0 to 30 or an alkyl group having from 1 to 12 carbon atoms; $R^{25}$ is an alkyl group with 1 to 12 carbon atoms and $R^{26}$ is a hydrogen or an alkyl groups having from 1 to 12 carbon atoms, $3 \leq a+b+c+d+e+f+g+h \leq 500$, $b+f \geq 1$, $c+g>0$, $d+h \geq 1$, and a plus b plus c plus d equals 2.

6. The method of claim 1, wherein polyorganosiloxane has the formula:

$$M^1_a D^1_e D^2_f D^3_g D^4_h T^1_i T^2_j T^3_k T^4_l Q_m$$

wherein:

$M^1 = R^1R^2R^3SiO_{1/2}$ $D^1 = R^{13}R^{14}SiO_{2/2}$ $D^2 = R^{15}R^{16}SiO_{2/2}$ $D^3 = R^{17}R^{18}SiO_{2/2}$ $D^4 = R^{19}R^{20}SiO_{2/2}$ $T^1 = R^{21}SiO_{3/2}$ $T^2 = R^{22}SiO_{3/2}$ $T^3 = R^{23}SiO_{3/2}$ $T^4 = R^{24}SiO_{3/2}$ $Q = SiO_{4/2}$ and, $R^1$ is an alkyl group having from 1 to 12 carbon atoms, an OH or $OR^{25}$; $R^2$, $R^3$, $R^{13}$, $R^{14}$, $R^{16}$, $R^{18}$, $R^{21}$ are alkyl groups having from 1 to 12 carbon atoms; $R^{15}$, $R^{22}$ are $(C_nH_{2n})-O-(C_2H_4O)_o-(C_3H_6O)_p-(C_4H_8O)_q-R^{26}$, n equals 0 to 6, o equals 0 to 100, p equals 0 to 100 and q equals 0 to 50, provided $o+p+q \geq 1$; $R^{17}$ and $R^{23}$ are linear, branched or cyclic, saturated or unsaturated alkyl groups having from 4 to 36 carbon atoms; $R^{19}$ and $R^{24}$ are aryl groups having the general formula $(C_rH_{2r})B$ wherein r equals 0-30 and B is an aryl radical; $R^{20}$ is an aryl group having the general formula $(C_rH_{2r})B$, wherein r equals 0 to 30 or an alkyl group having from 1 to 12 carbon atoms; $R^{25}$ is an alkyl group with 1 to 12 carbon atoms and $R^{26}$ is a hydrogen or an alkyl groups having from 1 to 12 carbon atoms, $i+j+k+l+m>0$; $a=2+i+j+k+l+2m$; $a+e+f+g+h+i+j+k+l+m \leq 500$, $f+j \geq 1$, $g+k>0$, $h+l \geq 1$.

7. The method of claim 1, wherein the polyorganosiloxane has the formula:

$$M^1 D^1_e D^2_f D^3_g D^4_h M^1_a$$

wherein:

$M^1 = R^1R^2R^3SiO_{1/2}$ $D^1 = R^{13}R^{14}SiO_{2/2}$ $D^2 = R^{15}R^{16}SiO_{2/2}$ $D^3 = R^{17}R^{18}SiO_{2/2}$ $D^4 = R^{19}R^{20}SiO_{2/2}$ and, $R^1$ is an alkyl group having from 1 to 12 carbon atoms, an OH or $OR^{25}$; $R^2$, $R^3$, $R^{13}$, $R^{14}$, $R^{16}$, $R^{18}$ are alkyl groups having from 1 to 12 carbon atoms; $R^{15}$ is $(C_nH_{2n})-O-(C_2H_4O)_o-(C_3H_6O)_p-(C_4H_8O)_q-R^{26}$, n equals 0 to 6, o equals 0 to 100, p equals 0 to 100 and q equals 0 to 50, provided $o+p+q \geq 1$; $R^{17}$ is a linear, branched or cyclic, saturated or unsaturated alkyl groups having from 4 to 36 carbon atoms; and $R^{19}$ is an aryl group having the general formula $(C_rH_{2r})B$ wherein r equals 0-30 and B is an aryl radical; $R^{20}$ is an aryl group having the general formula $(C_rH_{2r})B$, wherein r equal 0 to 30 or an alkyl group having from 1 to 12 carbon atoms; $R^{25}$ is an alkyl group with 1 to 12 carbon atoms and $R^{26}$ is a hydrogen or an alkyl groups having from 1 to 12 carbon atoms, $1 \leq e+f+g+h \leq 498$, $f \geq 1$, $g>0$ and $h \geq 1$.

8. The method of claim 7, wherein $R^1$ is $CH_3$, OH or $OCH_3$; $R^2$, $R^3$, $R^{13}$, $R^{14}$, $R^{16}$, $R^{18}$ are $CH_3$, $R^{20}$ is an aryl having the formula $(C_rH_{2r})B$, with the proviso if the polyorganosiloxane contains diphenyl $R^{19}$ and $R^{20}$ are $C_6H_5$.

9. The method of claim 7, wherein $R^1$ is $CH_3$, OH or $OCH_3$; $R^2$, $R^3$, $R^{13}$, $R^{14}$, $R^{16}$, $R^{18}$ are $CH_3$; and $R^{20}$ is $CH_3$.

10. The method of claim 1, wherein the polyorganosiloxane has the structure:

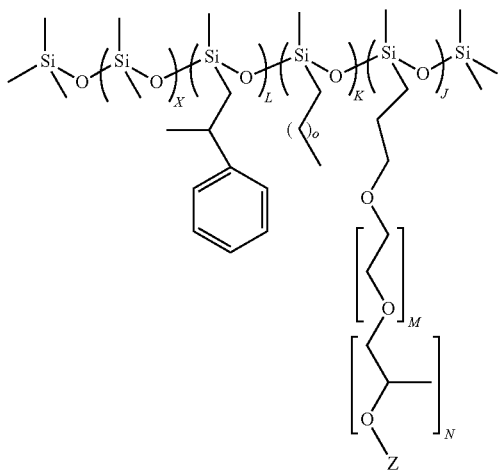

wherein X equals 0 to 498 L equals 1 to 300, K equals 1 to 300, J equals 1 to 300, M equals 0 to 100, N equals 0 to 100, with the proviso that M+N equals 1 to 200, and O equals 2 to 33 and Z is a hydrogen or an alkyl group having from 1 to 12 carbon atoms.

11. The method of claim 1, further comprising at least one organic demulsifier selected from the group consisting of sulfonic acids, carboxylic acids, thiocarboxylic acids, carboxylic acid esters, phosphinic acids, alkyleneoxide polymers, alkyleneoxide copolymers, alkyleneoxide-functionalized phenolic resins, epoxy resins, amine alkyleneoxides, polyimine alkoxylates, polyester amines, cationic surfactants, bis-amides, silicone-based homopolymers and silicone-based copolymers.

12. The method of claim 1, wherein the at least one polyorganosiloxane demulsifier is used at a concentration of from 0.1 to 10,000 ppm of the total composition.

13. The method of claim 1, wherein the at least one polyorganosiloxane demulsifier is used at a concentration of from 0.5 to 1000 ppm of the total composition.

14. The method of claim 1, wherein the at least one polyorganosiloxane demulsifier is used at a concentration of from 5 to 500 ppm of the total composition.

15. The method of claim 1, wherein the at least one polyorganosiloxane demulsifier comprises a blend of two or more polyorganosiloxanes.

16. A composition comprising:
a) a demulsifying-effective amount of at least one polyorganosiloxane demulsifier having a molecular structure comprising a polysiloxane backbone of at least two siloxane units covalently bound to (i) one or more pendant alkylene oxide groups comprising one or more alkylene oxide units independently having 1 to 6 carbon atoms, (ii) one or more pendant groups having the formula $(C_rH_{2r})B$ wherein r equals 0 to 30 and B is an aryl radical; and (iii) one or more pendant alkyl groups having at least 4 and up to 40 carbon atoms;
b) an aqueous phase; and
c) an oil phase.

17. The composition of claim 16, wherein the polyorganosiloxane has the formula:

$$M^1_a M^2_b M^3_c M^4_d D^1_e D^2_f D^3_g D^4_h T^1_i T^2_j T^3_k T^4_l Q_m$$

wherein:
$M^1 = R^1 R^2 R^3 SiO_{1/2}$
$M^2 = R^4 R^5 R^6 SiO_{1/2}$
$M^3 = R^7 R^8 R^9 SiO_{1/2}$
$M^4 = R^{10} R^{11} R^{12} SiO_{2/2}$
$D^1 = R^{13} R^{14} SiO_{2/2}$
$D^2 = R^{15} R^{16} SiO_{2/2}$
$D^3 = R^{17} R^{18} SiO_{2/2}$
$D^4 = R^{19} R^{20} SiO_{2/2}$
$T^1 = R^{21} SiO_{3/2}$
$T^2 = R^{22} SiO_{3/2}$
$T^3 = R^{23} SiO_{3/2}$
$T^4 = R^{24} SiO_{3/2}$
$Q = SiO_{4/2}$ and, $R^1$ is an alkyl group having from 1 to 12 carbon atoms, an OH or $OR^{25}$; $R^2$, $R^3$, $R^5$, $R^6$, $R^8$, $R^9$, $R^{13}$, $R^{14}$, $R^{16}$, $R^{18}$, $R^{21}$ are alkyl groups having from 1 to 12 carbon atoms; $R^4$, $R^{15}$, $R^{22}$ are $(C_nH_{2n})$—O—$(C_2H_4O)_o$—$(C_3H_6O)_p(C_4H_8O)_q$—$R^{26}$, n equals 0 to 6, o equals 0 to 100, p equals 0 to 100 and q equals 0 to 50, provided o+p+q≧1; $R^7$, $R^{17}$, $R^{23}$ are branched, linear or cyclic, saturated or unsaturated alkyl groups having from 4 to 36 carbon atoms; $R^{10}$, $R^{19}$, $R^{24}$ are aryl groups having the general formula $(C_rH_{2r})B$ wherein r equals 0-30 and B is an aryl radical; $R^{11}$, $R^{12}$, $R^{20}$ are aryl groups having the general formula $(C_rH_{2r})B$, wherein r equals 0 to 30 or an alkyl group having from 1 to 12 carbon atoms; $R^{25}$ is an alkyl group with 1 to 12 carbon atoms and $R^{26}$ is a hydrogen or alkyl group having from 1 to 12 carbon atoms, wherein the subscripts a, b, c, d, e, f, g, h, i, j, k, l, m are zero or positive integers for molecules subject to the following limitations: 3≦a+b+c+d+e+f+g+h+i+j+k+l+m≦500, b+f+j≧1, c+g+k>0, d+h+l≧1, and (a+b+c+d) equals 2+i+j+k+l+2m.

18. The composition of claim 17, wherein $R^1$ is $CH_3$, OH or $OCH_3$; $R^2$, $R^3$, $R^5$, $R^6$, $R^8$, $R^9$, $R^{13}$, $R^{14}$, $R^{16}$, $R^{18}$, $R^{21}$ are $CH_3$, $R^{20}$ is an aryl having the formula $(C_rH_{2r})B$ and $R^{11}$, $R^{12}$ are either $CH_3$ or an aryl having the formula $(C_rH_{2r})B$, with the proviso if the polysiloxane contains diphenyl $R^{19}$ and $R^{20}$ are $C_6H_5$.

19. The composition of claim 17, wherein $R^1$ is $CH_3$, OH or $OCH_3$; $R^2$, $R^3$, $R^5$, $R^6$, $R^8$, $R^9$, $R^{13}$, $R^{14}$, $R^{16}$, $R^{18}$, $R^{21}$ are $CH_3$, and $R^{11}$, $R^{12}$, $R^{20}$ are $CH_3$.

20. The composition of claim 16, wherein the polyorganosiloxane has the formula:

$$M^1_a M^2_b M^3_c M^4_d D^1_e D^2_f D^3_g D^4_h$$

wherein:
$M^1 = R^1 R^2 R^3 SiO_{1/2}$
$M^2 = R^4 R^5 R^6 SiO_{1/2}$
$M^3 = R^7 R^8 R^9 SiO_{1/2}$
$M^4 = R^{10} R^{11} R^{12} SiO_{2/2}$
$D^1 = R^{13} R^{14} SiO_{2/2}$
$D^2 = R^{15} R^{16} SiO_{2/2}$
$D^3 = R^{17} R^{18} SiO_{2/2}$
$D^4 = R^{19} R^{20} SiO_{2/2}$ and, $R^1$ is an alkyl group having from 1 to 12 carbon atoms, an OH or $OR^{25}$; $R^2$, $R^3$, $R^5$, $R^6$, $R^8$, $R^9$, $R^{13}$, $R^{14}$, $R^{16}$, $R^{18}$ are alkyl groups having from 1 to 12 carbon atoms; $R^4$, and $R^{15}$, are $(C_nH_{2n})$—O—$(C_2H_4O)_o$—$(C_3H_6O)_p$—$(C_4H_8O)_q$—$R^{26}$; n equals 0 to 6, o equals 0 to 100, p equals 0 to 100 and q equals 0 to 50, provided o+p+q≧1; $R^7$ and $R^{17}$ are linear, branched or cyclic, saturated or unsaturated alkyl groups having from 4 to 36 carbon atoms; $R^{10}$ and $R^{19}$ are aryl groups having the formula $(C_rH_{2r})B$ wherein r equals 0 to 30 and B is an aryl radical; $R^{11}$, $R^{12}$, $R^{20}$ are aryl groups having the general formula $(C_rH_{2r})B$, wherein r equals 0 to 30 or an alkyl group having from 1 to 12 carbon atoms; $R^{25}$ is an alkyl group with 1 to 12 carbon atoms and $R^{26}$ is a hydrogen or an alkyl groups having from 1 to 12 carbon atoms, 3≦a+b+c+d+e+f+g+h≦500, b+f≧1, c+g>0, d+h≧1, and a plus b plus c plus d equals 2.

21. The composition of claim 16, wherein polyorganosiloxane has the formula:

$$M^1_a D^1_e D^2_f D^3_g D^4_h T^1_i T^2_j T^3_k T^4_l Q_m$$

wherein:
$M^1 = R^1 R^2 R^3 SiO_{1/2}$
$D^1 = R^{13} R^{14} SiO_{2/2}$
$D^2 = R^{15} R^{16} SiO_{2/2}$
$D^3 = R^{17} R^{18} SiO_{2/2}$
$D^4 = R^{19} R^{20} SiO_{2/2}$
$T^1 = R^{21} SiO_{3/2}$
$T^2 = R^{22} SiO_{3/2}$
$T^3 = R^{23} SiO_{3/2}$
$T^4 = R^{24} SiO_{3/2}$
$Q = SiO_{4/2}$ and, $R^1$ is an alkyl group having from 1 to 12 carbon atoms, an OH or $OR^{25}$; $R^2$, $R^3$, $R^{13}$, $R^{14}$, $R^{16}$, $R^{18}$, $R^{21}$ are alkyl groups having from 1 to 12 carbon atoms; $R^{15}$, $R^{22}$ are $(C_2H_{2n})-O-(C_2H_4O)_o-(C_3H_6O)_p-(C_4H_8O)_q-R^{26}$, n equals 0 to 6, o equals 0 to 100, p equals 0 to 100 and q equals 0 to 50, provided $o+p+q \geq 1$; $R^{17}$ and $R^{23}$ are linear, branched or cyclic, saturated or unsaturated alkyl groups having from 4 to 36 carbon atoms; $R^{19}$ and $R^{24}$ are aryl groups having the general formula $(C_rH_{2r})B$ wherein r equals 0 to 30 and B is an aryl radical; $R^{20}$ is an aryl group having the general formula $(C_rH_{2r})B$, wherein r equals 0 to 30 or an alkyl group having from 1 to 12 carbon atoms; $R^{25}$ is an alkyl group with 1 to 12 carbon atoms and $R^{26}$ is a hydrogen or an alkyl groups having from 1 to 12 carbon atoms, $i+j+k+l+m>0$; $a=2+i+j+k+l+2m$, $3 \leq a+e+f+g+h+i+j+k+l+m \leq 500$, $f+j \geq 1$, $g+k>0$, $h+l \geq 1$.

22. The composition of claim 16, wherein the polyorganosiloxane has the formula:

$$M^1 D^1_e D^2_f D^3_g D^4_h M^1$$

wherein:
$M^1 = R^1 R^2 R^3 SiO_{1/2}$
$D^1 = R^{13} R^{14} SiO_{2/2}$
$D^2 = R^{15} R^{16} SiO_{2/2}$
$D^3 = R^{17} R^{18} SiO_{2/2}$
$D^4 = R^{19} R^{20} SiO_{2/2}$ and, $R^1$ is an alkyl group having from 1 to 12 carbon atoms, an OH or $OR^{25}$; $R^2$, $R^3$, $R^{13}$, $R^{14}$, $R^{16}$, $R^{18}$ are alkyl groups having from 1 to 12 carbon atoms; $R^{15}$ is $(C_nH_{2n})-O-(C_2H_4O)_o-(C_3H_6O)_p-(C_4H_8O)_q-R^{26}$, n equals 0 to 6, o equals 0 to 100, p equals 0 to 100 and q equals 0 to 50, provided $o+p+q \geq 1$; $R^{17}$ is a linear, branched or cyclic, saturated or unsaturated alkyl groups having from 4 to 36 carbon atoms; and $R^{19}$ is an aryl group having the general formula $(C_rH_{2r})B$ wherein r equals 0-30 and B is an aryl radical; $R^{20}$ is an aryl group having the formula $(C_rH_{2r})B$, wherein r equal 0 to 30 or an alkyl group having from 1 to 12 carbon atoms; $R^{25}$ is an alkyl group with 1 to 12 carbon atoms and $R^{26}$ is a hydrogen or an alkyl group having from 1 to 12 carbon atoms, $1 \leq e+f+g+h \leq 498$, $f \geq 1$, $g>0$ and $h \geq 1$.

23. The composition of claim 22, wherein $R^1$ is $CH_3$, OH or $OCH_3$, $R^2$, $R^3$, $R^5$, $R^6$, $R^8$, $R^9$, $R^{13}$, $R^{14}$, $R^{16}$, $R^{18}$ are $CH_3$, and $R^{20}$ is $CH_3$.

24. The composition of claim 22, wherein $R^1$ is $CH_3$, OH or $OCH_3$; $R^2$, $R^3$, $R^{13}$, $R^{14}$, $R^{16}$, and $R^{18}$ are $CH_3$, $R^{20}$ is an aryl having the formula $(C_rH_{2r})B$, with the proviso if the polysiloxane contains diphenyl $R^{19}$ and $R^{20}$ are $C_6H_5$.

25. The composition of claim 16 wherein the polyorganosiloxane has the structure:

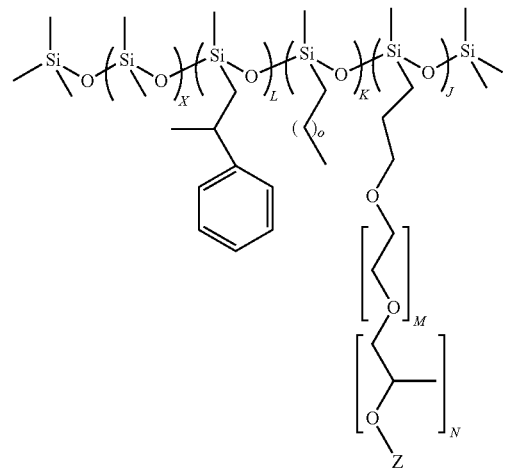

wherein X equals 0 to 498, L equals 1 to 300, K equals 1 to 300, J equals 1 to 300, M equals 0 to 100, N equals 0 to 100, with the proviso that M+N equals 1 to 200, and O equals 2 to 33 and Z is a hydrogen or an alkyl group having from 1 to 12 carbon atoms.

26. The composition of claim 16, further comprising at least one organic demulsifier selected from the group consisting of sulfonic acids, carboxylic acids, thiocarboxylic acids, carboxylic acid esters, phosphinic acids, alkyleneoxide polymers, alkyleneoxide copolymers, alkyleneoxide-functionalized phenolic resins, epoxy resins, amine alkyleneoxides, polyimine alkoxylates, polyester amines, cationic surfactants, bis-amides, silicone-based homopolymers and silicone-based copolymers.

27. The composition of claim 16, wherein the at least one polyorganosiloxane demulsifier is used at a concentration of from 5 to 500 ppm of the total composition.

* * * * *